United States Patent
Matsuoka

[11] Patent Number: 5,953,011
[45] Date of Patent: *Sep. 14, 1999

[54] SELECTION ITEM DISPLAY SYSTEM USING AN ADAPTIVE-TYPE BACKEND SYSTEM REQUIRED FOR USER'S OPERATION SUPPORT IN A FRONTEND AND A LEARNING SERVER, AND METHODS

[75] Inventor: Masahiro Matsuoka, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/521,727

[22] Filed: Aug. 31, 1995

[30] Foreign Application Priority Data

Sep. 1, 1994 [JP] Japan .................................. 6-208309

[51] Int. Cl.$^6$ ...................................................... G06F 3/14
[52] U.S. Cl. ............................................. 345/352; 345/334
[58] Field of Search ..................................... 395/333, 334, 395/336, 337, 338, 348, 339, 326, 352, 353, 23, 20, 51, 75, 77; 345/333, 334, 336, 337, 338, 348, 339, 326, 352, 353; 706/25, 60, 46, 59, 61

[56] References Cited

U.S. PATENT DOCUMENTS

| | | | |
|---|---|---|---|
| 5,125,071 | 6/1992 | Ozeki | 395/352 |
| 5,396,264 | 3/1995 | Falcone et al. | 345/146 |
| 5,438,661 | 8/1995 | Ogawa | 395/346 |
| 5,469,352 | 11/1995 | Yukutomo et al. | 364/192 |
| 5,564,004 | 10/1996 | Grossman et al. | 395/348 |
| 5,574,846 | 11/1996 | Yoshimura et al. | 395/118 |

*Primary Examiner*—Matthew M. Kim
*Assistant Examiner*—Crescelle N. dela Torre
*Attorney, Agent, or Firm*—Staas & Halsey

[57] ABSTRACT

An easy-operation selection item display system and method is provided for use in an information processing device. Specifically, an appropriate amendment method and display method can be automatically provided for various types of selecting operations to improve the efficiency of the users' selecting operations. The operation model learning device generates, for example, an operation model $B_1$ by learning, using a probability model of the history of the past selecting operations of the user collected by the operation history collecting device for each of, for example, the selecting operation group $A_1$. The operation model translating device translates, for example, an operation model $B_1$, and generates, for example, the descriptions $C_1$ of the display method. The selecting function providing device displays a selection item such as selecting operation group $A_1$, etc. according to the display method specified by, for example, the description $C_1$. The user selects the next item from the selection items displayed as the result of the past selecting operations with the optimum time of operations.

19 Claims, 31 Drawing Sheets

| $X_1$ | $X_2$ | $X_3$ | $X_4$ | $X_5$ |

FIG. 3A

| $X_1$ | $X_2$ | $X_3$ | $X_4$ | $X_5$ |
| $X_2$ | $X_3$ | $X_4$ | $X_5$ | |
| $X_3$ | $X_4$ | $X_5$ | | |
| $X_4$ | $X_5$ | | | |
| $X_5$ | | | | |

FIG. 3B

| (WHEN ITEM $X_1$ IS SELECTED) | (ITEM $X_{t11}$) | (ITEM $X_{t12}$) | ... | (ITEM $X_{t1K}$) |
|---|---|---|---|---|
| (WHEN ITEM $X_2$ IS SELECTED) | (ITEM $X_{t21}$) | (ITEM $X_{t22}$) | ... | (ITEM $X_{t2K}$) |
| ⋮ | ⋮ | ⋮ | ⋮ | ⋮ |
| (WHEN ITEM $X_K$ IS SELECTED) | (ITEM $X_{tK1}$) | (ITEM $X_{tK2}$) | ... | (ITEM $X_{tKK}$) |

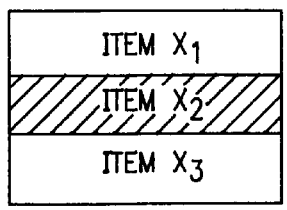
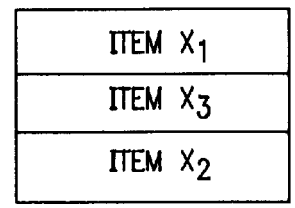
FIG. 19A     FIG. 19B
| NEXT / PREVIOUS | ITEM $X_1$ | ITEM $X_2$ | ITEM $X_3$ |
|---|---|---|---|
| ITEM $X_1$ | 0.2 | 0.35 | 0.45 |
| ITEM $X_2$ | 0.5 | 0.2 | 0.3 |
| ITEM $X_3$ | 0.1 | 0.7 | 0.2 |
FIG. 20
| | | | |
|---|---|---|---|
| WHEN $X_1$ IS SELECTED | $X_3$ | $X_2$ | $X_1$ |
| WHEN $X_2$ IS SELECTED | $X_1$ | $X_3$ | $X_2$ |
| WHEN $X_3$ IS SELECTED | $X_2$ | $X_3$ | $X_1$ |
FIG. 21

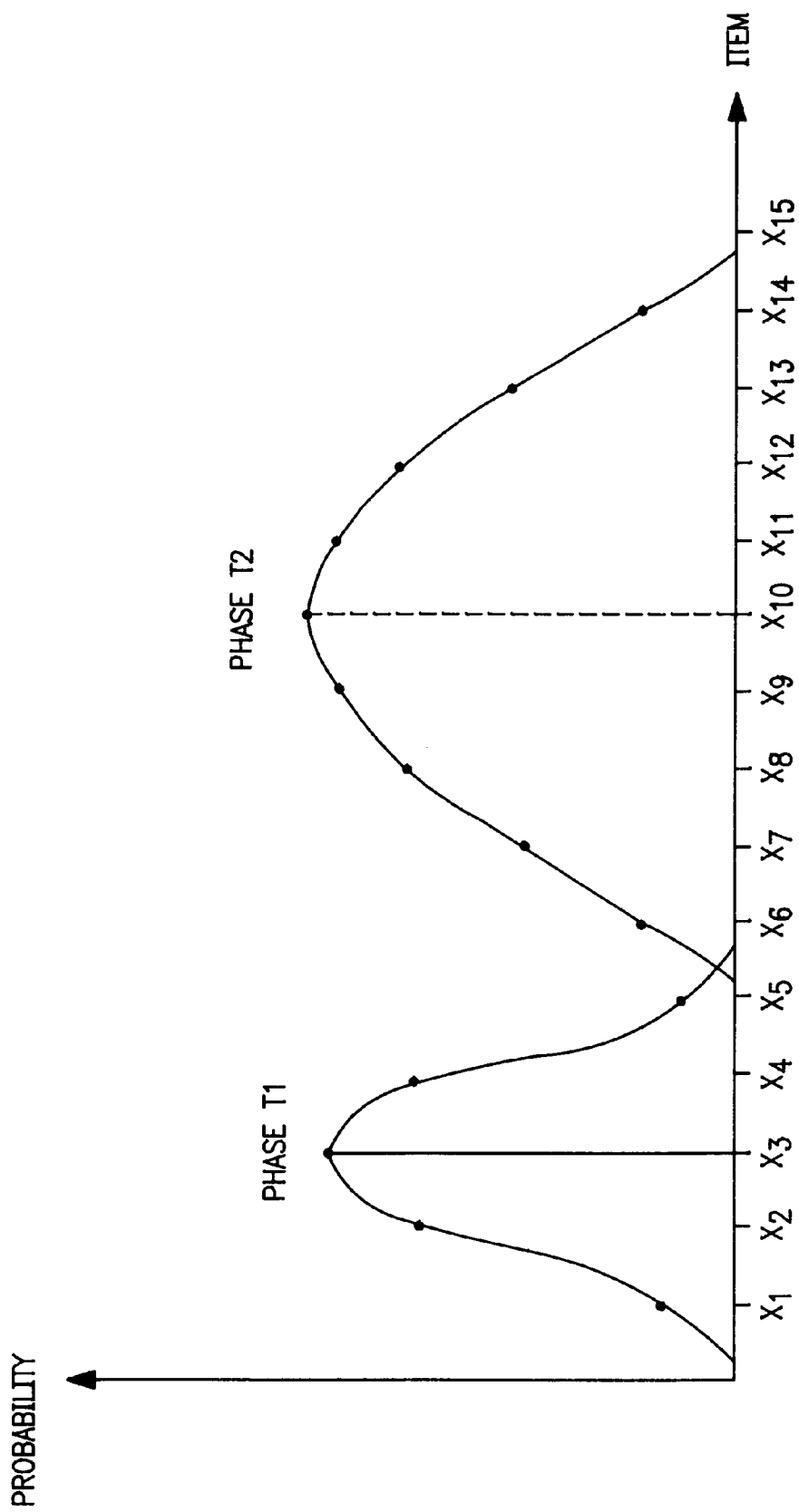

PHASE T1

⟶ OPERATION DIRECTION

| $X_3$ | $X_2$ | $X_4$ | $X_1$ | $X_5$ |
|---|---|---|---|---|

FIG. 23A

PHASE T2

⟶ OPERATION DIRECTION

| $X_{10}$ | $X_9$ | $X_{11}$ | $X_8$ | $X_{12}$ | $X_7$ | $X_{13}$ | $X_6$ | $X_{14}$ |
|---|---|---|---|---|---|---|---|---|

FIG. 23B

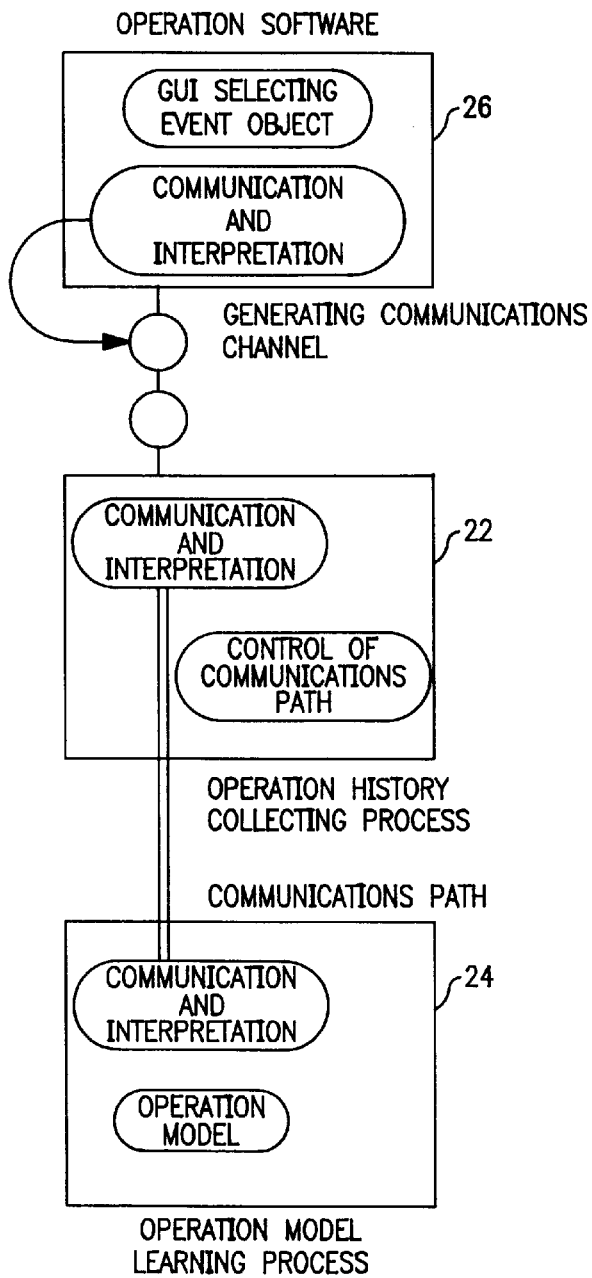
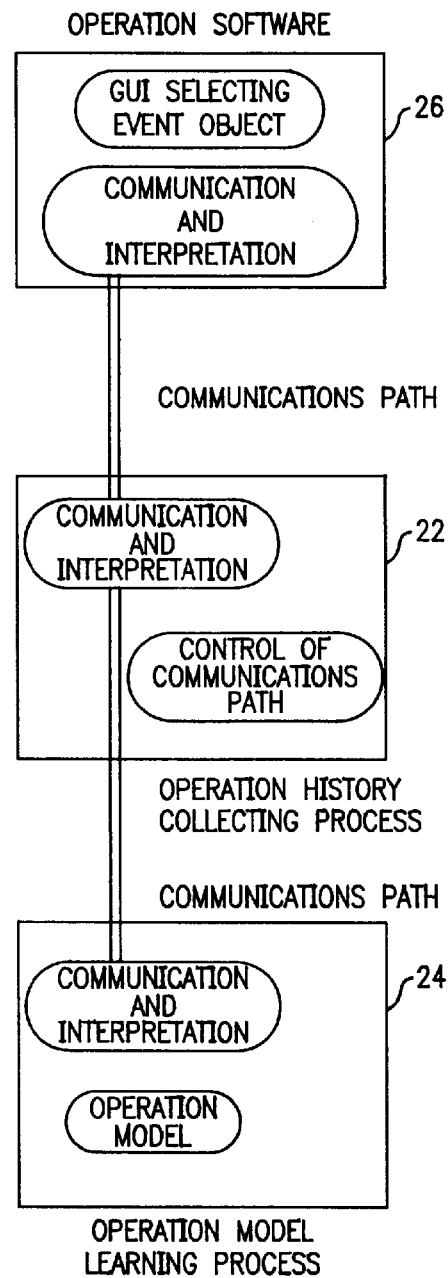
FIG. 32B
FIG. 32C

SELECTION ITEM DISPLAY SYSTEM USING AN ADAPTIVE-TYPE BACKEND SYSTEM REQUIRED FOR USER'S OPERATION SUPPORT IN A FRONTEND AND A LEARNING SERVER, AND METHODS

BACKGROUND OF THE INVENTION

1. Field of the Invention

The present invention relates to a user interface in an information processing device, and more specifically to a system and method of supporting the operations of the user involved in electronic technology.

2. Description of the Related Art

As being widely used with multimedia, etc., the advanced information processing and communications technology has been introduced to a wider range of our society, and ordinary users have more opportunities to operate information processing terminal units.

Many work stations and personal computers are operated with multiple windows and the user proceeds with his or her work by selecting desired items from a large menu, for example, a character conversion menu for displaying a plurality of Kanji characters (Japanese-style Chinese characters), as candidates in word processing operations. In such electronic operations, a more easily operated user interface between information processing devices and the users is demanded.

A user interface for an information processing terminal unit displays on the screen, etc. a menu of a plurality of selection items to be selected by a user. If the user selects; one of the items, the interface automatically instructs the processor, etc. to perform a process for the selection item. To more easily perform the selected operations, the order of selection items may be automatically modified and displayed.

The conventional methods of improving the efficiency of the operations by automatically modifying and displaying the selection items are classified into the following three groups for modification, and two groups for display. The conventional technology is realized by optionally combining the modification and display groups.

Modification method (a) A selection history indicating the last selected item is recorded, and items are sequentially selected according to the history.

(b) Items are selected according to an entry system, and the order of the selection items is determined based on the selection history.

(c) In addition to the order based on the selection history, the time at which each item was selected is stored. If an item is not selected within a predetermined time, the item is deleted.

Display method (d) Selection items are displayed in one direction.

(e) Selection items are displayed in group units. The item groups can be displayed either sequentially or selectively.

Most of the prior art can be represented by a combination of any of the modification methods (a) and display methods (b). That is, a plurality of selection items are displayed in one direction according to the latest selection of the user.

However, the following problems exist in the conventional automatic modification and display methods. Since the function object "menu" and the learning device for learning the selection history are incorporated into one unit, it is difficult to adjust and modify the display method and learning device.

Since the learning function is not completely independent, it is difficult for a single learning device to provide learning functions for different units requiring the same learning capabilities.

Furthermore, since the entire learning result directly corresponds to the representation of the function, that is, incorporated into the program code, the method is poor in flexibility and produces waste when functions of different restrictions are displayed in the display step.

Additionally, since the operations are considerably limited to configure the selecting operation support system, the system is rather closed and limited, and can hardly meet the demand for a flexible support system.

It is very difficult to separate the contents of the operations from the function or the operations from the learning device. Therefore, when a plurality of different operations are performed, the user should prepare different systems having a learning function for each operation.

SUMMARY OF THE INVENTION

The present invention aims at providing an easily operated selection item display system and method to be used in an information processing device. In detail, it aims at automatically providing the users requiring various selecting operations with appropriate modification and display methods, depending on the types of selecting operations and on the amount of their work, to improve the efficiency and reliability in selecting operations.

The present invention relates to a selection item display system and method operated in a system which displays selection items during the operation using an information processing device, and operates corresponding to items selected by the user.

The selection item display system comprises a collecting unit, learning unit, translating unit, display unit, storage unit, and management unit. The collecting unit collects user-selected items as an operation history. The learning unit generates an operation model which indicates the features of user's selecting operations. The translating unit generates the descriptions of the display method from the operation model generated by the learning unit and the display restrictions designating the display format for the selection items. The display unit displays the selection items according to the descriptions of the display method generated by the translating unit. The storage unit stores the operation model and the descriptions of the display method. The management unit specifies one selecting operation in the information processing device, provides the learning unit with a probability model which can be used in the selecting operation, provides the translating unit with a display order evaluating method and display restrictions which can be used in the selecting operation to manage the operations of the learning unit and translating unit.

The learning unit generates an operation model using a probability model describing the probability of selecting a certain selection item. According to the operation history, the probability of selecting the selection item indicated by the operation model stored in the storage unit is altered to update the operation model. The translating unit evaluates the operation modes and determines the display order of the selection items. According to the display order and display restrictions, the latest and most appropriate display method is generated. Furthermore, the descriptions of the display method stored in the storage unit are updated depending on the update of the operation model and the alteration to the display restrictions.

The collecting unit, learning unit, translating unit, display unit, and management unit correspond to an operation history collecting device, operation model learning device, operation model translating device, selecting function providing device, and learning kernel operation management device respectively in the configuration of the embodiment of the present invention. The storage unit corresponds to a memory.

The collecting unit collects the past user-selection results, and the learning unit learns the collected results to update the operation model indicating the features of the selecting operations.

Then, the translating unit evaluates the operation model and generates the descriptions of the display method appropriate for the display format specified according to the display restrictions.

Thus, the display unit displays the selection items in a specified display format in the display order indicating the features of the past user-selecting operations. The display order represents the rate of selecting a certain selection item in the past (empirical probability).

When the information processing device requires various selecting operations, the management unit specifies a selecting operation to be performed with the support of the collecting unit, learning unit, translating unit, and display unit. Thus, a single system can support various selecting operations.

Since the management unit provides the learning unit with a probability modal which can be used for the selecting operation, and also provides the translating unit with the evaluation method and display restrictions of the display order which can be used for the selecting operation, the operations of the learning unit and translating unit are collectively managed by the management unit.

Storing the operation model and the descriptions of the display method in the storage unit enables the learning unit and translating unit to refer to and update the descriptions. Therefore, the descriptions of the display method are generated according to the latest information.

The display method and learning function can be easily adjusted and modified because the display unit for displaying a menu including a plurality of selection items, etc. is provided independently of the learning unit having the learning function.

Since the learning unit supports the function of a plurality of different Detecting operations and provides a learning function, the operation model, that is, a learning result, is not subject to display restrictions and therefore can be applied to selecting operations of different display formats.

The present invention realizes an open system capable of adjusting and modifying a selecting operation to be supported, an operation model, and the descriptions of a display method, and can appropriately process changes according to the current situation.

According to the present invention, the operations are efficiently performed by the information processing device. Practically, the following effects can be obtained.

A function such as a menu, etc. can be separate from the learning function, and therefore a display method and learning function can be easily adjusted and modified.

The learning function can be independent, and a single learning function provides learning capabilities for different functions requiring the same learning capabilities.

Since the learning results correspond to the representation of the function through highly abstract descriptions, they can be processed collectively and efficiently when the functions are subject to different restrictions in the display method.

The contents of the operations are hierarchically realized using a support object, operation model, and the descriptions of the display method. Since they can be modified and newly entered when necessary and supported by the open system according to the present invention, flexible support can be easily offered even when a quite different support method is demanded.

According to the present: invention, the contents of the operations are separate from the function or the learning capabilities, and therefore a single system can provide the learning capabilities for a plurality of different operations.

BRIEF DESCRIPTION OF THE DRAWINGS

The present invention will be more apparent from the following detailed description, when taken in conjunction with the accompanying drawings, in which;

FIGS. 3A and 3B show examples of restrictions on the display;

FIGS. 19A and 19B show examples of the menu display according to a Markov model.

FIG. 20 shows an example of an empirical transition probability matrix;

FIG. 21 shows an example (2) of the descriptions of the display method;

FIG. 22 shows an example of an inconstant operation model;

FIGS. 23A and 23B show examples of the menu display according to an inconstant operation model;

FIGS. 32A, 32B, and 32C show the method of connecting the operation history collecting process to the operation software;

DESCRIPTION OF THE PREFERRED EMBODIMENTS

The present invention is described by referring to the attached drawings.

Figure 1:
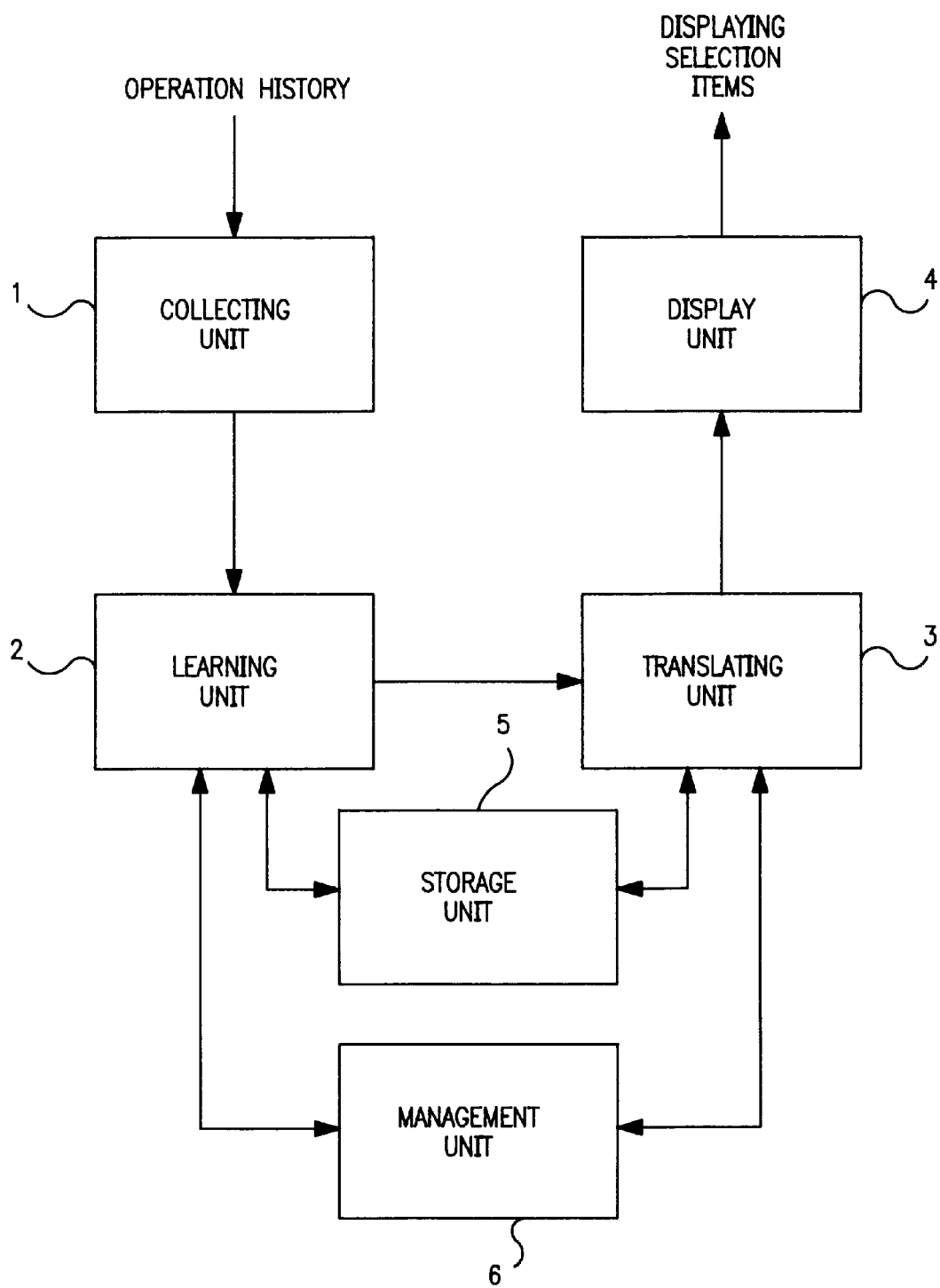
FIG. 1 shows the principle of the present invention.

FIG. 1 shows the principle of the present invention. The selection item display system comprises a collecting unit 1, learning unit 2, translating unit 3, display unit 4, storage unit 5, and management unit 6. The collecting unit 1 collects user-selected items as an operation history. The learning unit 2 generates an operation model which indicates the features of user's selecting operations. The translating unit 3 generates the descriptions of the display method from the operation model generated by the learning unit 2 and the display restrictions designating the display format for the selection items. The display unit 4 displays the selection items according to the descriptions of the display method generated by the translating unit. The storage unit 5 stores the operation modes and the descriptions of the display method. The management unit 6 specifies one selecting operation in the information processing device, provides the learning unit with a probability model which can be used in the selecting operation, and provides the translating unit 3 with a display order evaluating method and display restrictions which can be used in the selecting operation to manage the operations of the learning unit and translating unit.

The learning unit 2 generates an operation model using a probability model describing the probability of selecting a certain selection item. According to the operation history, the probability of selecting the selection item indicated by the operation model stored in the storage unit is altered to update the operation model. The translating unit 3 evaluates the operation model and determines the display order of the selection items. According to the display order and display restrictions, the latest and most appropriate display method is generated. Furthermore, the descriptions of the display method stored in the storage unit are updated depending on the update of the operation model and the alteration to the display restrictions.

The collecting unit 1 collects the past user-selection results, and the learning unit 2 learns the collected results to update the operation model indicating the features of the selecting operations.

Then, the translating unit 3 evaluates the operation model and generates the descriptions of the display method appropriate for the display format specified according to the display restrictions.

Thus, the display unit displays the selection items in a specified display format in the display order indicating the features of the past user-selecting operations. The display order represents the rate of selecting a certain selection item in the past (empirical probability).

When the information processing device requires various selecting operations, the management unit 6 specifies a selecting operation to be performed with the support of the collecting unit 1, learning unit 2, translating unit 3, and display unit 4. Thus, a single system can support various selecting operations.

Since the management unit 6 provides the learning unit 2 with a probability model which can be used for the selecting operation, and also provides the translating unit 3 with the evaluation method and display restrictions of the display order which can be used for the selecting operation, the operations of the learning unit and translating unit are collectively managed by the management unit.

Storing the operation model and the descriptions of the display method in the storage unit enables the learning unit 2 and translating unit 3 to refer to and update the descriptions. Therefore, the descriptions of the display method are generated according to the latest information.

The display method and learning function can be easily adjusted and modified because the display unit 4 for displaying a menu including a plurality of selection items, etc. is provided independently of the learning unit having the learning function.

Since the learning unit 2 supports the function of a plurality of different selecting operations and provides a learning function, the operation model, that is, a learning result, is not subject to display restrictions and therefore can be applied to selecting operations of different display formats.

The present invention realizes an open system capable of adjusting and modifying a selecting operation to be supported, an operation model, and the descriptions of a display method, and can appropriately process changes according to the current situation.

Figure 2:
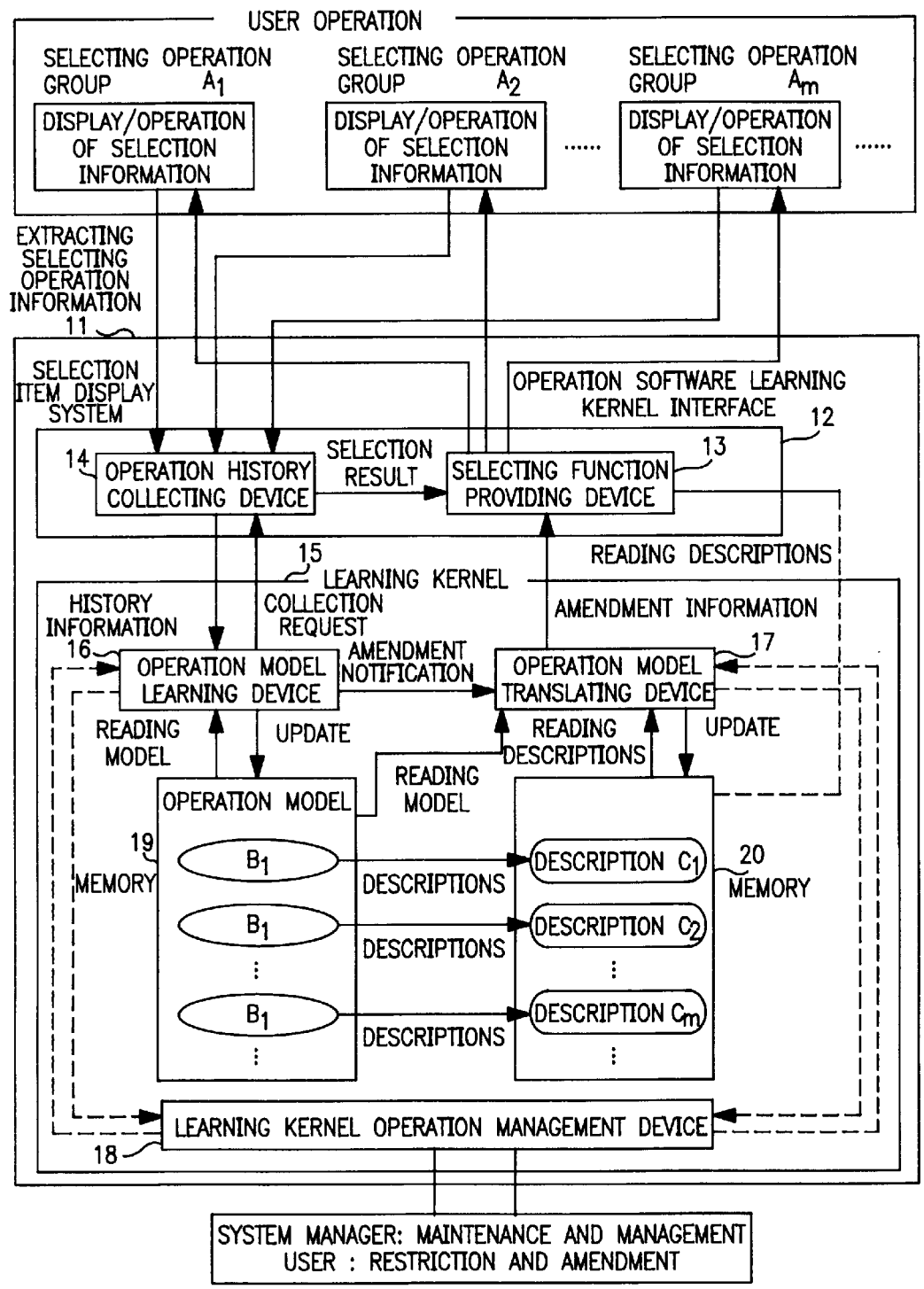
FIG. 2 shows the configuration of an embodiment of the present invention.

FIG. 2 shows the configuration of the selection item display system according to an embodiment of the present invention. A selection item display system 11 shown in FIG. 2 comprises a learning kernel 15 and an operation software/learning kernel interface 12 functioning as an interface between an operation software used in a user operation and the learning kernel 15.

The operation software/learning kernel interface 12 comprises a selecting function providing device 13 directly operated by a user and an operation history collecting device 14 for collecting the history (operation history) of the user's selecting operations.

The learning kernel 15, comprises an operation model learning device 16 for obtaining an operation model from the user's operation history through the learning capabilities, an operation model translating device 17 for describing the selecting function according to the operation model as a learning result, a learning kernel operation management device 18 for adjusting the operation conditions of the operation model learning device 16 and the operation model translating device 17, and memory 19 and 20.

The selecting function providing device 13 displays the selection items to actually perform a selecting operation, and instructs a processing device, etc. (not shown in FIG. 2) to perform the processes corresponding to the selected items. The selecting function providing device 13 provides the selecting function for plural sets of operation software, and appropriately changes the display system, display contents, and the method of processing the selection results in response to the display modify instruction and the contents of the modifications from the learning kernel 15. Then, necessary history information is obtained from the operation history collecting device 14 if necessary.

The operation history collecting device 14 monitors the operation of the user for each of the plural functions of the operation software by collecting the history specified by the learning kernel, collects the operation history, and transmits it to the learning kernel if necessary. Thus, the operation history collecting device 14 enables each of the functions of the operation software and the learning kernel 15 to communicate with each other. Furthermore, the operation history collecting device 14 transmits the information about the operation history (history information) in response to a demand from the selecting function providing device 13.

The operation model learning device 16 extracts the information structure, that is, an operation model, for each of the selecting operation group Am (m=1, 2, ...) indicating the user-selecting operation corresponding to the function of the operation software. The operation model learning device 16 determines an operation model corresponding to the selecting operation group, and instructs through a collection request the operation history collecting device 14 to output the necessary operation history collecting method and collection size required to verify the operation model.

An operation model can also be determined through the learning function according to the history information transmitted from the operation history collecting device 14, and the operation model Bm (m=1, 2, ...) independent for each selecting operation group is stored in the memory 19. If necessary, the operation model can be modified or discarded.

The operation model translating device 17 translates a model of each selecting operation group obtained by the operation model learning device 16, and generates the descriptions of the display method, for example, the display format, display contents, and processes performed on selection results under the restrictions of the display method (display restrictions) relating to various functions of the operation software. The descriptions are generated such that the time of operations of the user in each selecting operation group is optimum or close to the optimum value. The description Cm (m=1, 2, ...) is received by the selecting function providing device 13 and stored in the memory 20.

The learning kernel operation management device 18 can interactively access the system manager and learning kernel 15, and stores a basic operation file which is a rewritable file describing the basic operations of the learning kernel. The basic operation file contains the selecting operation group (to be learned) of the operation software, learning algorithm, description method of the learning results of a function, etc. so as to appropriately perform supporting processes through learning in a selecting operation by the system manager and the user.

If selecting operation groups $A_1$, $A_2$, ... are important selecting operation groups as shown in FIG. 2, the operation model learning device 16 stores operation models $B_1$, $B_2$, ... presumed by the learning function for the selecting operation groups. The operation model translating device 17 stores the descriptions $C_1$, $C_2$, ... of the selecting operation group after adding the display restrictions to the operation models.

The collecting unit 1, learning unit 2, translating unit 3, display unit 4, and management unit 6 correspond to an operation history collecting device 14, operation model learning device 16, operation model translating device 17, selecting function providing device 13, and learning kernel operation management device 18 respectively, in the configuration of the embodiment of the present invention. The storage unit 5 corresponds to a memory 20.

FIGS. 3A and 3B show examples of restrictions on the display used in generating the descriptions $C_1$, $C_2$, through the operation model translating device 17.

FIG. 3A shows the restrictions on the display of the menu indicating a series of 5 selection items $X_1$, $X_2$, $X_3$, $X_4$, and $X_5$ in a single direction. FIG. 3B shows the restrictions on the display by arranging selection items $X_1$, $X_2$, $X_3$, $X_4$, and $X_5$ from the left top toward the right bottom in pyramid form. In this case, the numbers of boxes of displayed selection items are 1, 2, 3, 4, and 5 for $X_1$ through $X_5$ respectively.

The selecting operation group sharing the same selection items can be different in display format, display contents, etc. depending on the display restrictions. For example, in the menu display shown in FIG. 3A, the operation amount depends on the present position of the cursor at the start of the selecting operation. Therefore, if a default cursor position is given, the position is restricted on the display.

When a selection item in each selecting operation group is displayed, the selecting operation cost can be reduced more successfully than in the selecting operation environment set at the start of the operation only if the selecting operation functions are prepared based on the descriptions $C_1$, $C_2$, ... generated by the operation model translating device 17.

According to the selection item display system 11, the display function is managed and automatically modified if necessary so that the amount of operations required for the selecting operation using the user's operation software, that is, the selecting operation cost, can be reduced to the optimum value. The display management and automatic modification through the selection item display system 11 are explained below in detail by referring to FIGS. 4 through 9.

The selection item display system 11 specifies, modifies, and activates a support object according to the descriptions in the basic operation file. Described first is the generation of the basic operation file.

Figure 4:
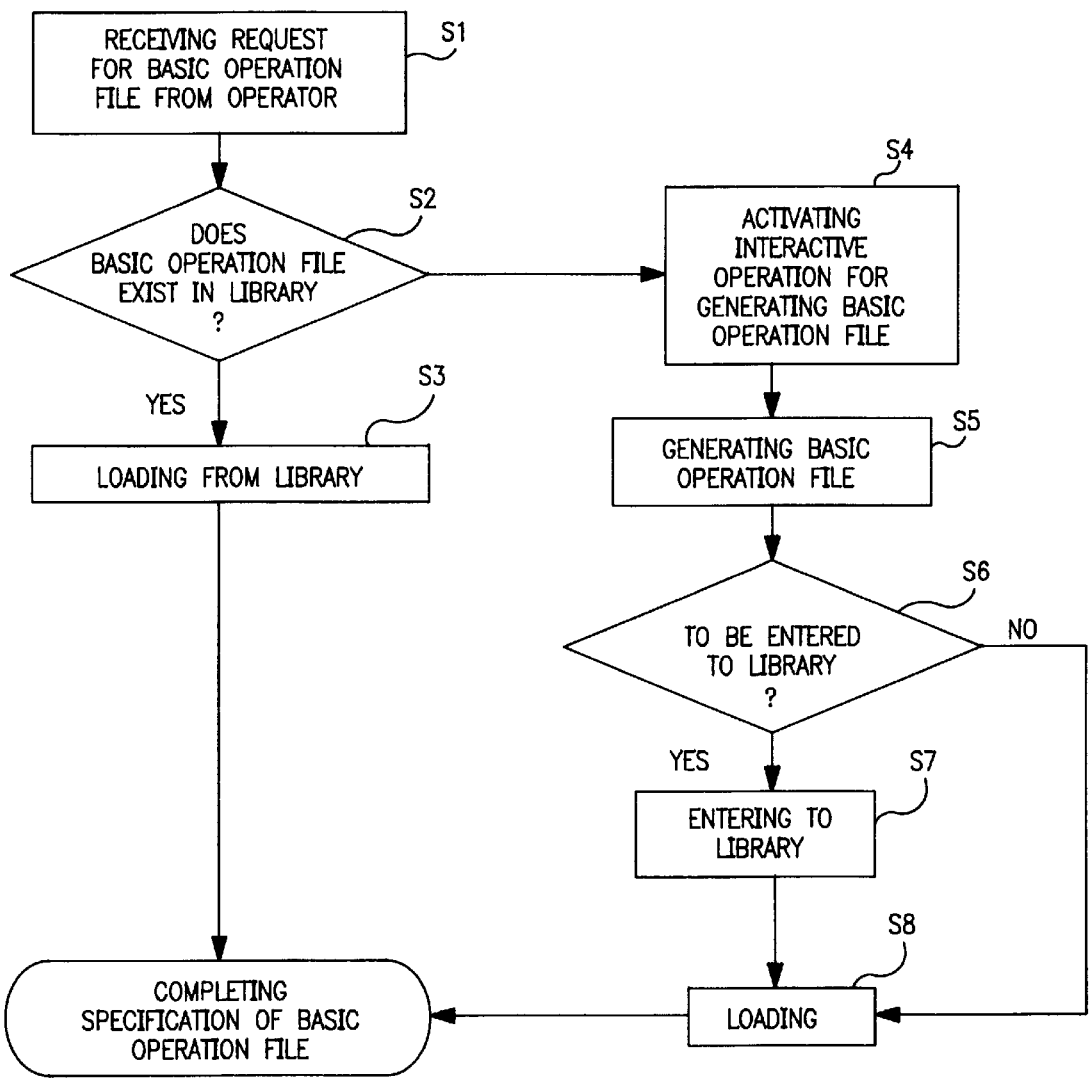
FIG. 4 is a flowchart (1) showing the preparation of a basic operation file.
Figure 5:
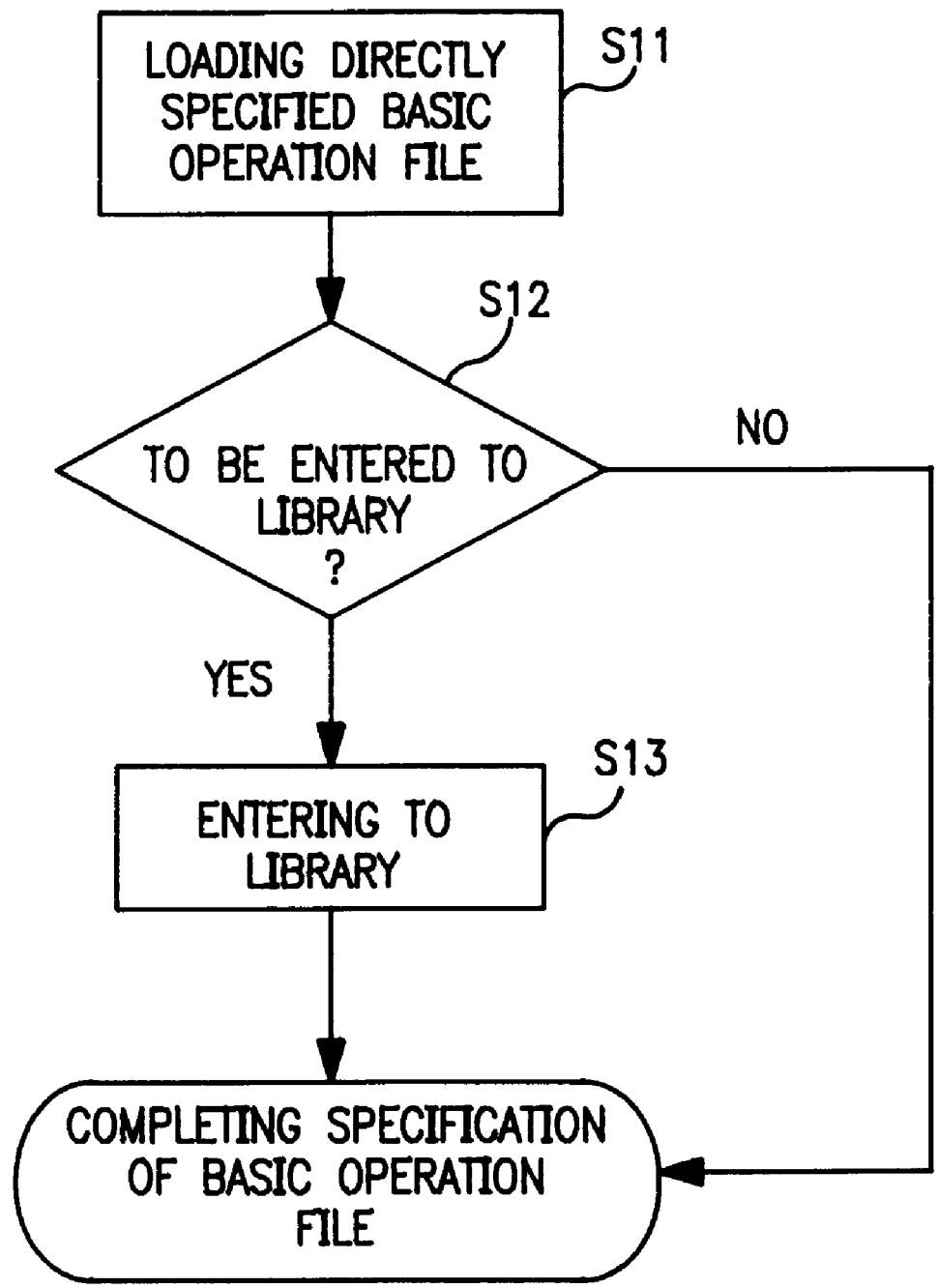
FIG. 5 is a flowchart (2) showing the preparation of a basic operation file.

FIGS. 4 and 5 are flowcharts showing the preparation for the basic operation file performed at the instruction of the system manager or the user, who is an operator of the selection item display system 11. The flowchart shown in FIG. 4 is followed if the basic operation file is indirectly prepared through interaction with the operator. The flowchart shown in FIG. 5 is followed if the directly-specified basic operation file is used.

In FIG. 4, the learning kernel operation management device 18 receives a request for the basic operation file from the operator (step S1). Then, it is checked whether or not the basic operation file resides in the library (not shown in FIG. 2) of the system (step S2). If "yes", the file is loaded from the library (step S3) and the specification of the basic operation file terminates.

Unless the basic operation file resides in the library, the learning kernel operation management device 18 activates the interactive operation of generating the basic operation file (step S4), and the basic operation file is generated in a predetermined format through interaction with the operator (step S5).

Next, the operator is asked whether or not the generated basic operation file should be entered to the library (step S6). If "yes", the generated basic operation file is entered to the library (step S7) and loaded (step S8). If the answer in step S6 is "no", then the generated basic operation file is directly loaded (step S8). Then, the specification of the basic operation file terminates.

In FIG. 5, the learning kernel operation management device 18 first loads the basic operation file directly specified by the operator in a predetermined format (step S11), and the operator is asked whether or not the file should be entered to the library (step S12). If "yes", the generated basic operation file is entered to the library (step S13), thereby terminating the specification of the basic operation file. If "no" in step S12, the specification of the basic operation file terminates without entry.

The specified basic operation file can be interactively adjusted and modified through the interactive operation of the learning kernel operation management device 18. The learning kernel operation management device 18 enters a number of basic operation files to the library to automatically use them at the request of the system manager or user.

Described below are the contents of the basic operation file. The basic operation file describes the initial settings for the system operations. The entered initial settings include a plurality of selecting operation groups to be supported; probability models used in learning each of the selecting operation groups; restrictions on the display of each selecting operation group; learning models used by the operation model learning device 16; evaluation functions used when the operation model translating device 17 determines the priority levels of the selection items; operation restrictions on the operations of each device in the system or on the relationship between devices, etc.

Figure 6:
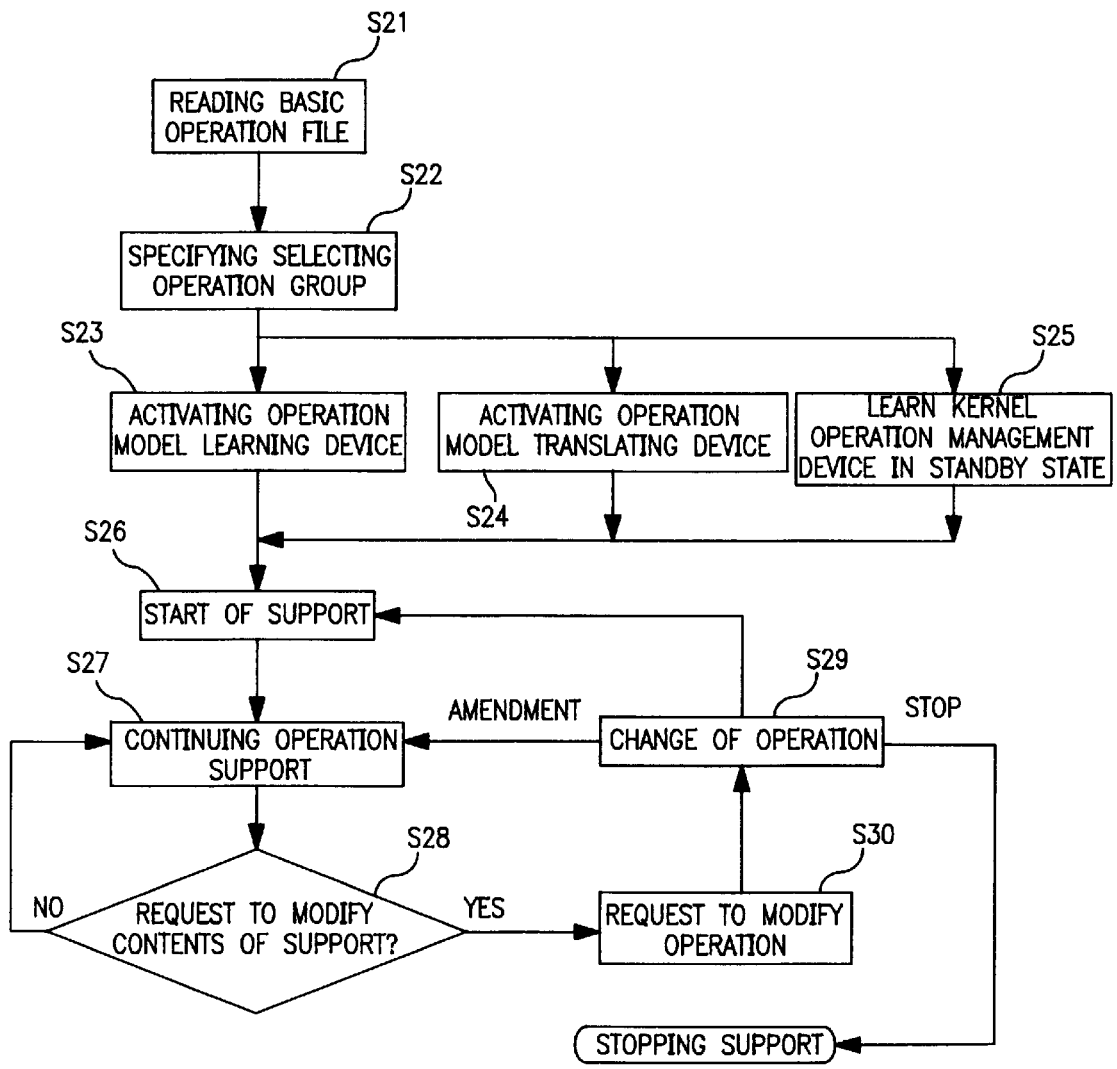
FIG. 6 is a flowchart showing the activation and common operations of the learning kernel.

FIG. 6 is a flowchart showing the activation and common operations of each device in the learning kernel 15.

In FIG. 6, the learning kernel 15 reads the basic operation file stored in the learning kernel operation management device 18 (step S21), and specifies a selecting operation group to be provided with the learning function (step S22). Then, the operation model learning device 16 and operation model translating device 17 are activated according to the basic operation file (steps S23 and S24) to set the learning kernel operation management device 18 in a standby state (step S25).

Unless a modify instruction is issued from the learning kernel operation management device 18, the operation model learning device 16 and operation model translating device 17 start supporting the selecting operation groups for predetermined contents (step S26) and autonomously continue the support (step S27).

When the modification of an operation, the termination of a modify instruction, or the presentation of modifications is required, the contents of the modification involved are reflected on the operations at an optimal timing according to the contents. Otherwise, each device is set in the standby state.

When a selecting operation group, operation model, or the contents of the descriptions of the selecting operation group, etc. are to be modified by the operator ("yes" in step S28), the necessary modifications are made by the learning kernel operation management device 18 through interactive processing. At this time, the learning kernel operation management device 18 receives from the operator a request to modify an operation (step S30), and modifies the operation of the learning kernel 15 (step S29).

Unless the contents of the support should be modified ("no" in step S18), the operator does not issue a request to modify an operation and the learning kernel 15 continues to support the selecting operation group (step S27).

Figure 7:
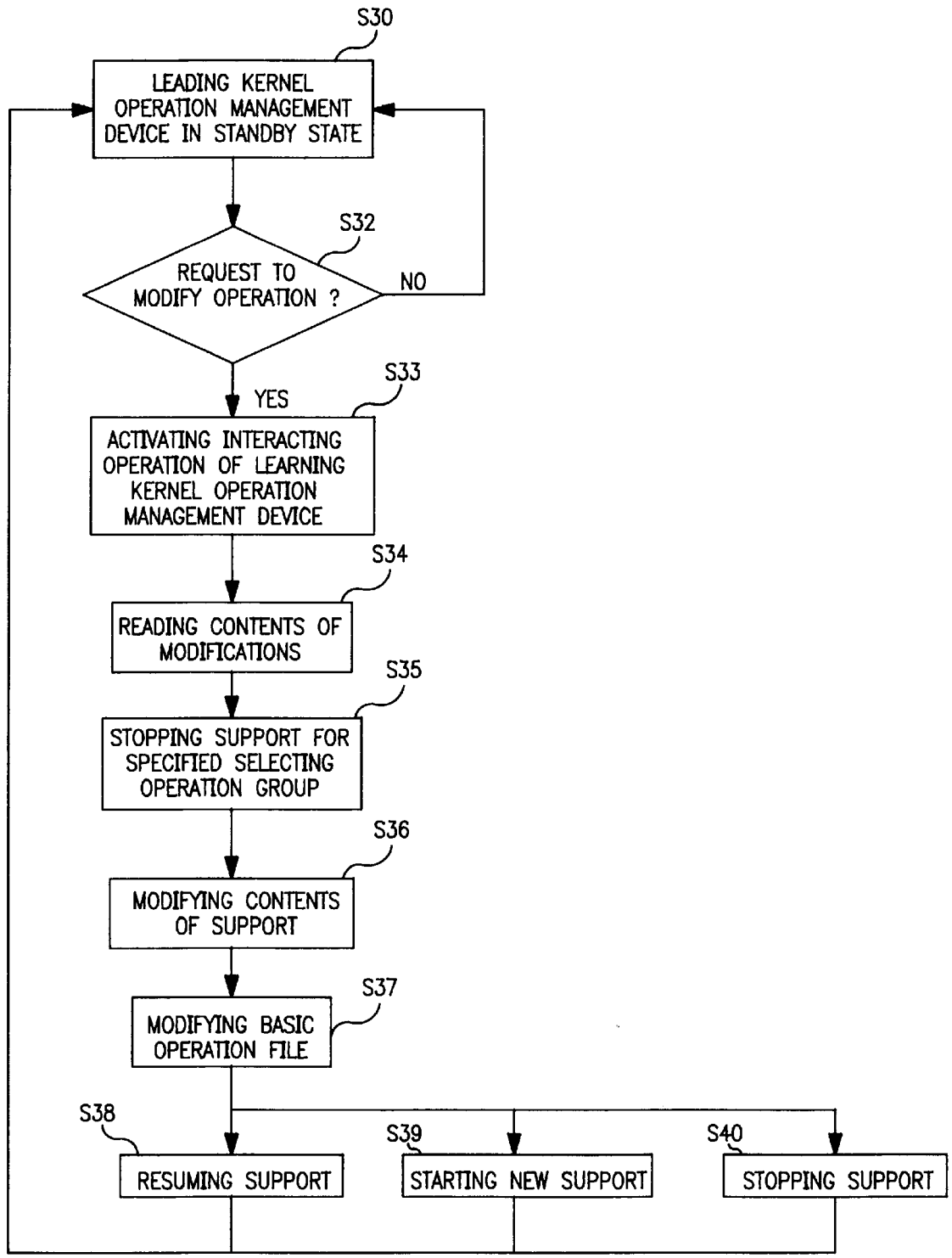
FIG. 7 is a flowchart showing the operation change of the learning kernel.

FIG. 7 is a flowchart showing the modification of an operation of the learning kernel 15 performed by the learning kernel operation management device 18 in step S29 shown in FIG. 6.

In FIG. 7, the learning kernel operation management device 18 in the standby state (step S31) checks the existence of a request to modify an operation (step S32). The learning kernel operation management device 18 is in the standby state unless the operator issues a request to modify an operation, but the interactive operation of the learning kernel operation management device 18 is activated if the request is entered (step S33).

Then, the contents of the modification specified by the operator are read (step S34), and the support for the selecting operation group for which modifications are specified is suspended (step S35). The contents of the support are modified according to the read contents of the modification (step S36), and the basic operation file is modified if necessary (step S37).

Unless the selecting operation group to be supported is modified, the support for the support-suspended selecting operation group is resumed (step S38). If a new selecting operation group is specified, the support for the new group is started (step S39). If a support abort instruction is issued, the support is terminated (step S40).

Thus, the learning kernel 15 dynamically aborts, resumes, or starts the support of a selection operation group. The selecting operation group can also be dynamically modified for its operation model or descriptions.

The restrictions on the learning algorithm of the operation model learning device 16 and the description generating algorithm of the operation model translating device 17 are specified according to the basic operation file of the learning kernel operation management device 18.

Figure 8:
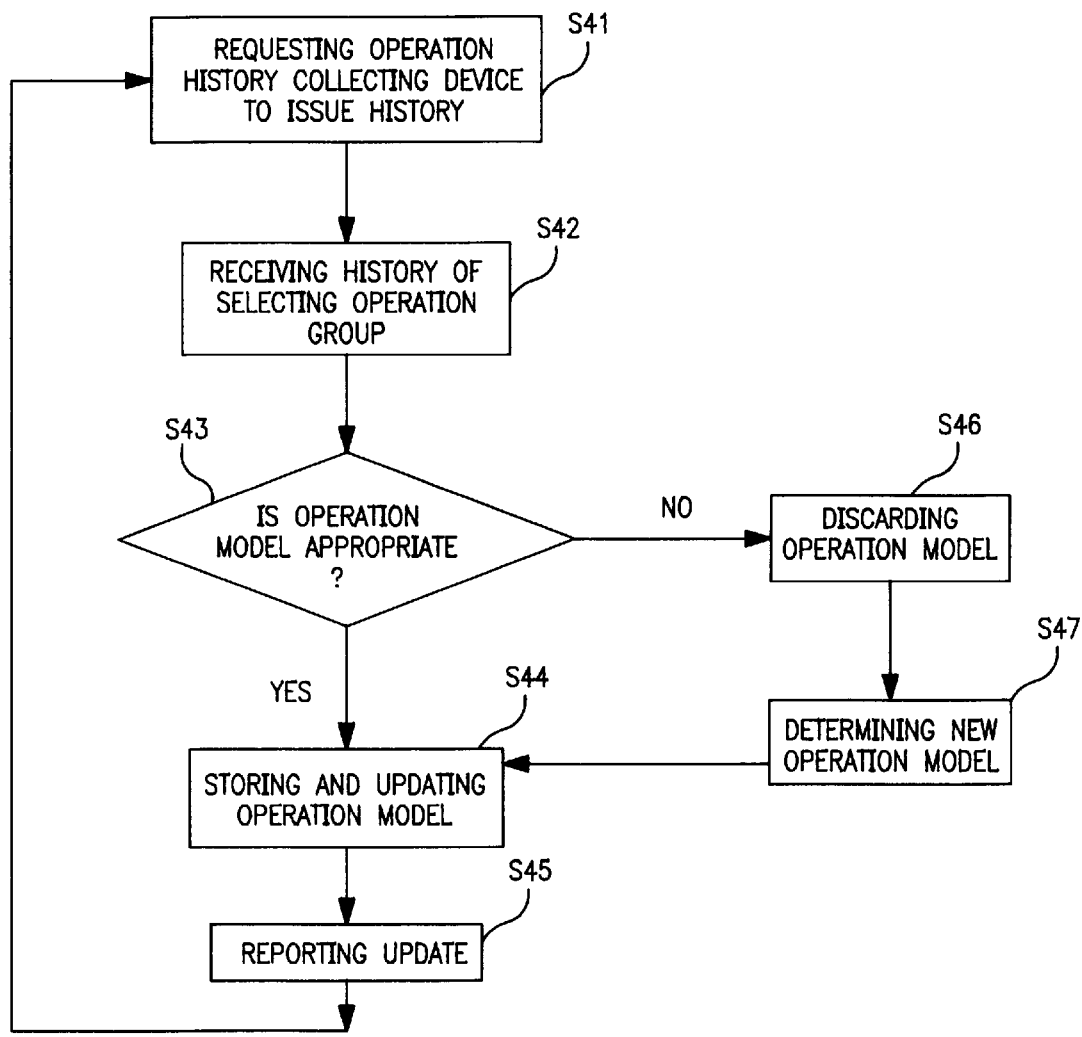
FIG. 8 is a flowchart (1) showing the operation of the operation model learning device.

FIG. 8 is a flowchart showing the operation of the operation model learning device 16.

The operation model learning device 16 is activated by the learning kernel operation management device 18, reads a basic operation file, and starts supporting an object selecting operation group.

In FIG. 8, the operation model learning device 16 instructs the operation history collecting device 14 to collect an operation history for the amount and format required to learn the operation model of each selecting operation group (step S41).

The operation history collecting device 14 collects the history of each selecting operation group for the amount and format specified by the operation model learning device 16, and transfers the history to the operation model learning device 16.

The operation model learning device 16 receives the transferred operation history (step S42) and checks whether or not the current operation model is acceptable (step S43). If acceptable, the operation model is stored and the received operation history is learned based on the specified learning algorithm to update the contents of the operation model for each selecting operation group (step S44).

If it is determined that the current operation model is not acceptable in step S43, the operation model is discarded (step S46). Based on the learning result, a new operation model is determined (step S47) and stored (step S44).

The operation model learning device 16 reports the update or modification of the operation model to the operation model translating device 17 (step S45) and repeats the operations in and after step S41.

Figure 9:
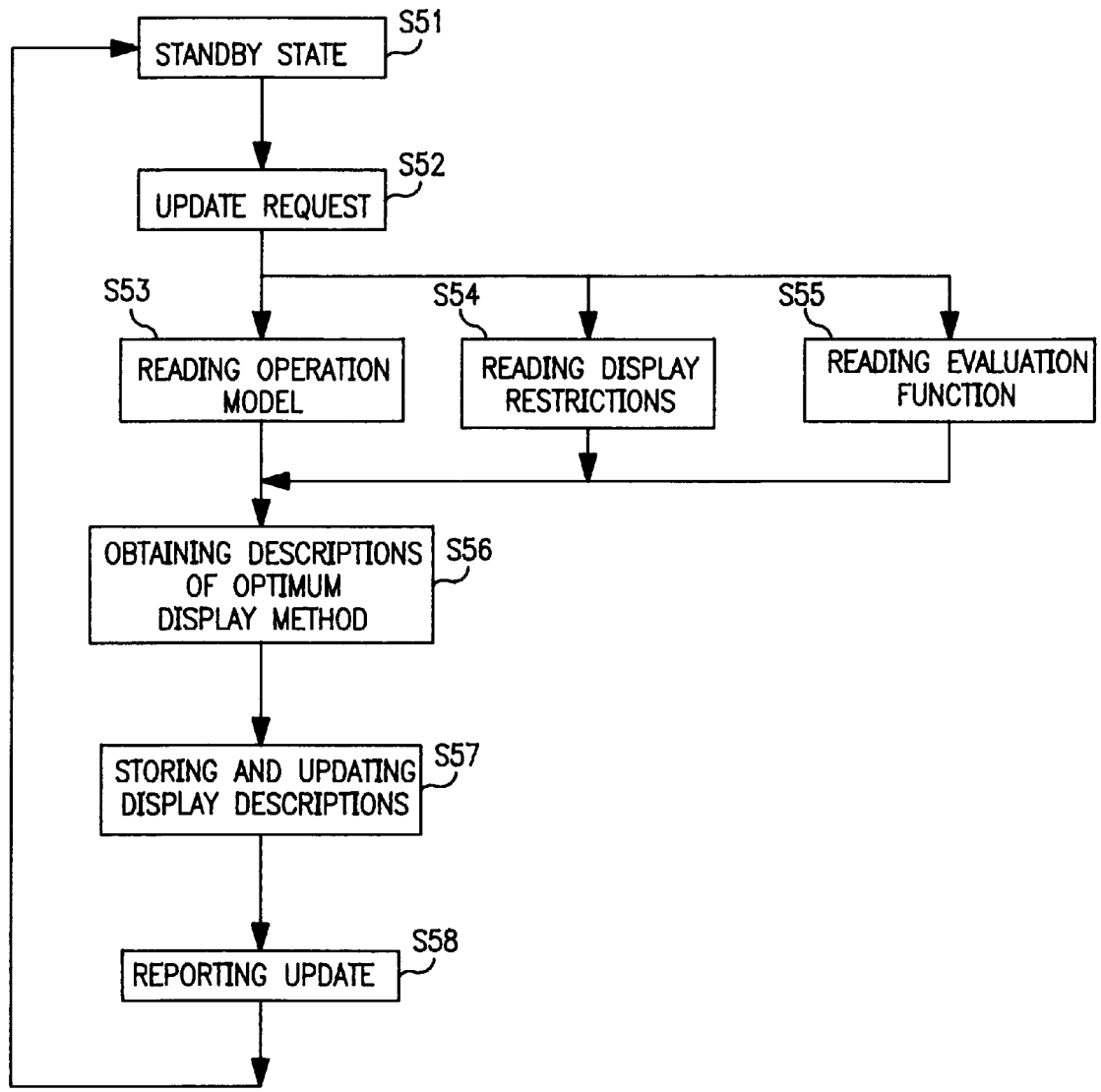
FIG. 9 is a flowchart (1) showing the operation of the operation model translating device.

FIG. 9 is a flowchart showing the operations of the operation model translating device 17.

In FIG. 9, the operation model translating device 17 in the standby state (step S51) reads the operation model, display restrictions, and evaluation function (steps S53, S54, and S55) when it receives an update or modification request (modification report) from the operation model learning device 16 (step S52).

According to the read operation model, display restrictions, and evaluation function, the descriptions of the optimum display method are generated (step S56) and stored (step S57) for the selecting operation group. Thus, the descriptions of the selecting operation group are updated.

Then, the update of the descriptions of the selecting operation group is reported to the selecting function providing device 13 (step S58) and the operation model translating device 17 returns to the standby state (step S51).

The selecting function providing device 13 receives the update report (modification report) from the operation model translating device 17 and realizes the display format for the selecting operation group according to the descriptions generated by the operation model translating device 17 at an optimal timing. The selection item display system 11 according to the present embodiment uses the obtained display format as a fixed format or reuses it after storing it in the memory (not shown in FIG. 2) of the system.

Furthermore, the selection item display system 11 according to the present embodiment guarantees the support and indicates its probability. It is configured based on the learning function of the operation model learning device 16, and supplements, evaluates, and modifies the learning result using the interactive operation of the learning kernel operation management device 18. The parameters for necessary calculations are represented in optimal precision.

Next the operations of the selection item display system 11 are explained by referring to FIGS. 10 through 13, using as an example the operation model in which the user's selection represents an operation completely independent of the past selection results.

This example refers to a basic operation and shows the learning portion separately from the descriptive portion in the operation history. The example shows that the display restrictions on the descriptions are placed and that the optimum operation amount (cost) is automatically provided for the object selecting operation group.

In a completely independent operation model, the following basic operation file is described by the learning kernel operation management device 18 and the system manager or user.

The selection item display system 11 provides the learning function for the selecting operation group $A_1$. The selecting operation group $A_1$ consists of K selection items from item $X_1$ through item $X_K$. The learning model for use in the learning process is an approximation-in-probability learning model to be used in presuming an independent trial matrix. The precision of approximation $\epsilon$ is represented as $0<\epsilon<1$.

The operation model is a probability model generated in the range of probability $P(X_1) \ldots, P(X_K)$ for the selection history generated in the user selecting operation of the selecting operation group $A_1$. It is represented as a polynomial distribution which is assumed as being completely independent for each trial, and represented by the K-dimensional probability vector in which the sum of elements is 1.

The display restrictions are placed so that K selection items are shown in a one-dimensional direction. The cost paid by the user for a selecting operation is represented by a natural number indicating the display order of the selection items. The selecting function providing device 13 displays items $X_1, X_2, X_3, \ldots X_K$ in the one-dimensional direction at the initial state to provide the user with the selecting operation function. In the display method, selecting operation histories are modified each time the number of $C_1$ ($\epsilon$, K) is collected.

Then, the displaying order for each operation is changed.

The selection item display system 11 is activated with the above described initial settings.

Figure 10:
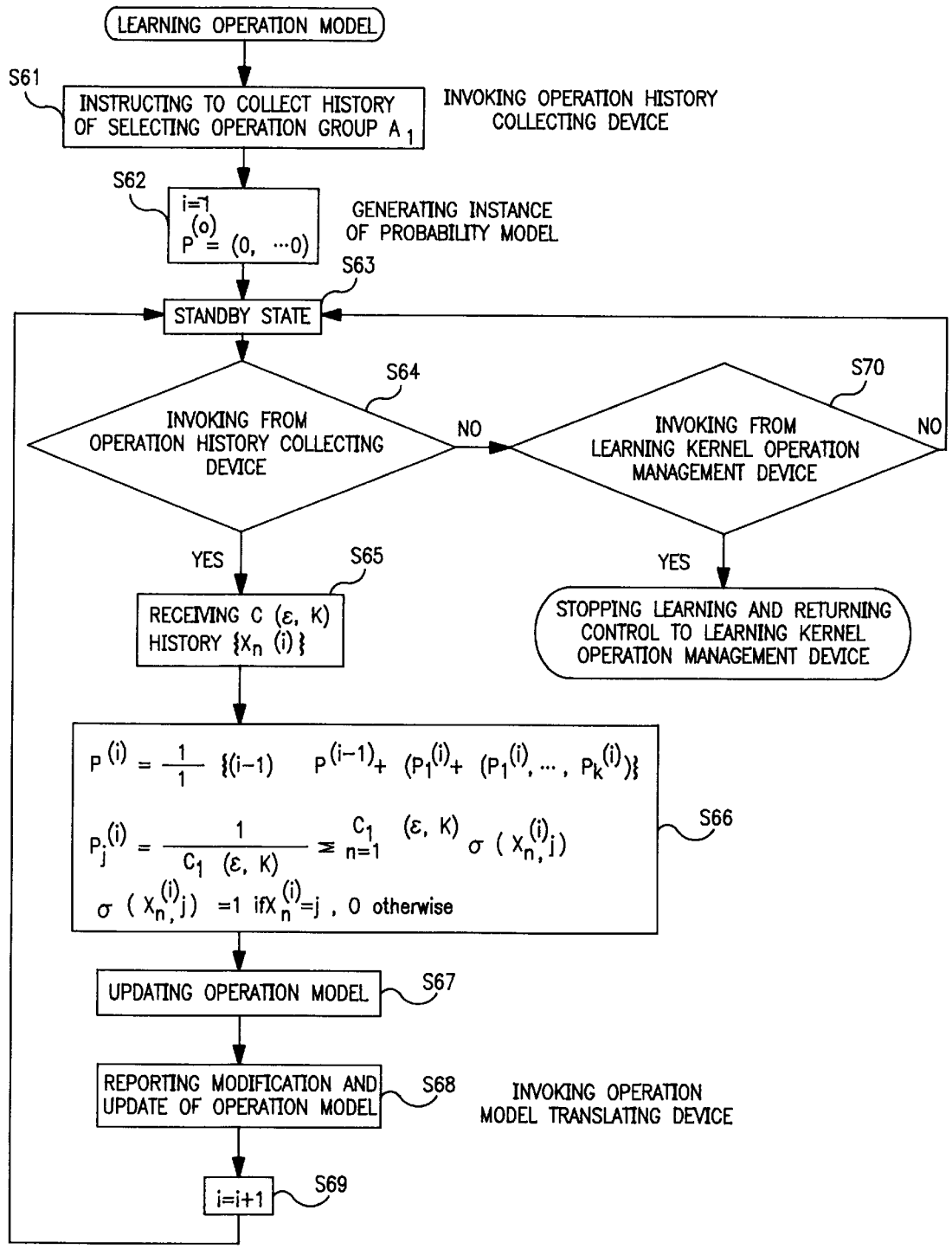
FIG. 10 is a flowchart (2) showing the operation of the operation model learning device.

FIG. 10 is a flowchart showing the operation of the activated operation model learning device 16.

In FIG. 10, the operation model learning device 16 requests the operation history collecting device 14 to collect the operation history and instructs the transfer of the operation history in the transfer unit of length $C_1$ ($\epsilon$, K) (step S61).

Using the following equation;

$$\hat{P}^{(0)} = (0, \ldots, 0) \qquad (1)$$

where i=1 and the initial empirical probability vector is $\hat{P}^{(0)}$, an instance of the probability model for the operation model is generated (step S62) and the operation model learning device 16 returns to the standby state (step S63).

When the operation model learning device 16 receives a call from the operation history collecting device 14 ("yes" in step S64), it receives the i-th operation history $\{x_n^{(i)}\}$ (i=1, 2, ...) (step S65) where $x_n^{(i)}$ indicates one of the indices 1 through K for items $X_1$ through $X_K$. The i-th operation history $\{x_n^{(i)}\}$ consists of $C_1$ ($\epsilon$, K) indices corresponding to n=1, 2, ..., $C_1$ ($\epsilon$, K).

Then, the i-th empirical probability vector $\hat{P}^{(i)}$ is represented by the following equation (step S66).

$$\hat{P}^{(i)} = \frac{1}{i}\{(i-1)\hat{P}^{(i-1)} + (\hat{p}_1^{(i)}, \ldots, \hat{p}_K^{(i)})\} \qquad (2)$$

$$\hat{p}_j^{(i)} = \frac{1}{C_1(\varepsilon, K)} \sum_{n=i}^{C_1(\varepsilon,K)} \sigma(x_n^{(i)}, j) \quad (1 \leq j \leq K) \qquad (3)$$

In equation (2) above, equation (1) is used for $\hat{P}^{(0)}$. The element $\hat{P}_j^{(i)}$ of the second term in { } is calculated by equation (3).

In equation (3), $\sigma(x_n^{(i)}, j)=1$ when $x_n^{(i)}=j$, and $\sigma(x_n^{(i)}, j)=0$ when $x_n^{(i)} \neq j$.

As shown in equations (2) and (3), $\hat{P}_j^{(i)}$ indicates the ratio of the index j contained in the $C_1(\epsilon, K)$ operation histories $\{x_n^{(i)}\}$. The j-th element $\hat{e}_j^{(i)}$ of the vector $\hat{P}^{(i)}$ indicates an average value of $\hat{P}_j^{(i)}, \ldots, P_j^{(i)}$. Therefore, the j-th element of the vector $\hat{P}_j^{(i)}$ indicates an average ratio of selecting the item $X_j$ in the past operations represented by the first through the i-th operation histories.

When the i-th empirical probability vector $\hat{P}^{(i)}$ is calculated, the operation model learning device 16 updates the operation model using the calculation result (step S67), and reports the update of the operation model to the operation model translating device 17 (step S68). The value of i is incremented (step S69), and the operation model learning device 16 returns to the standby state (step S63).

If the operation model learning device 16 receives no call from the operation history collecting device 14 ("no" in step S64), but receives a call from the learning kernel operation management device 18 ("yes" in step S70), it stops learning the operation history and control is returned to the learning kernel operation management device 18. Unless it receives a call from the learning kernel operation management device 18 ("no" in step S70), it remains in the standby state (step S63).

Figure 11:
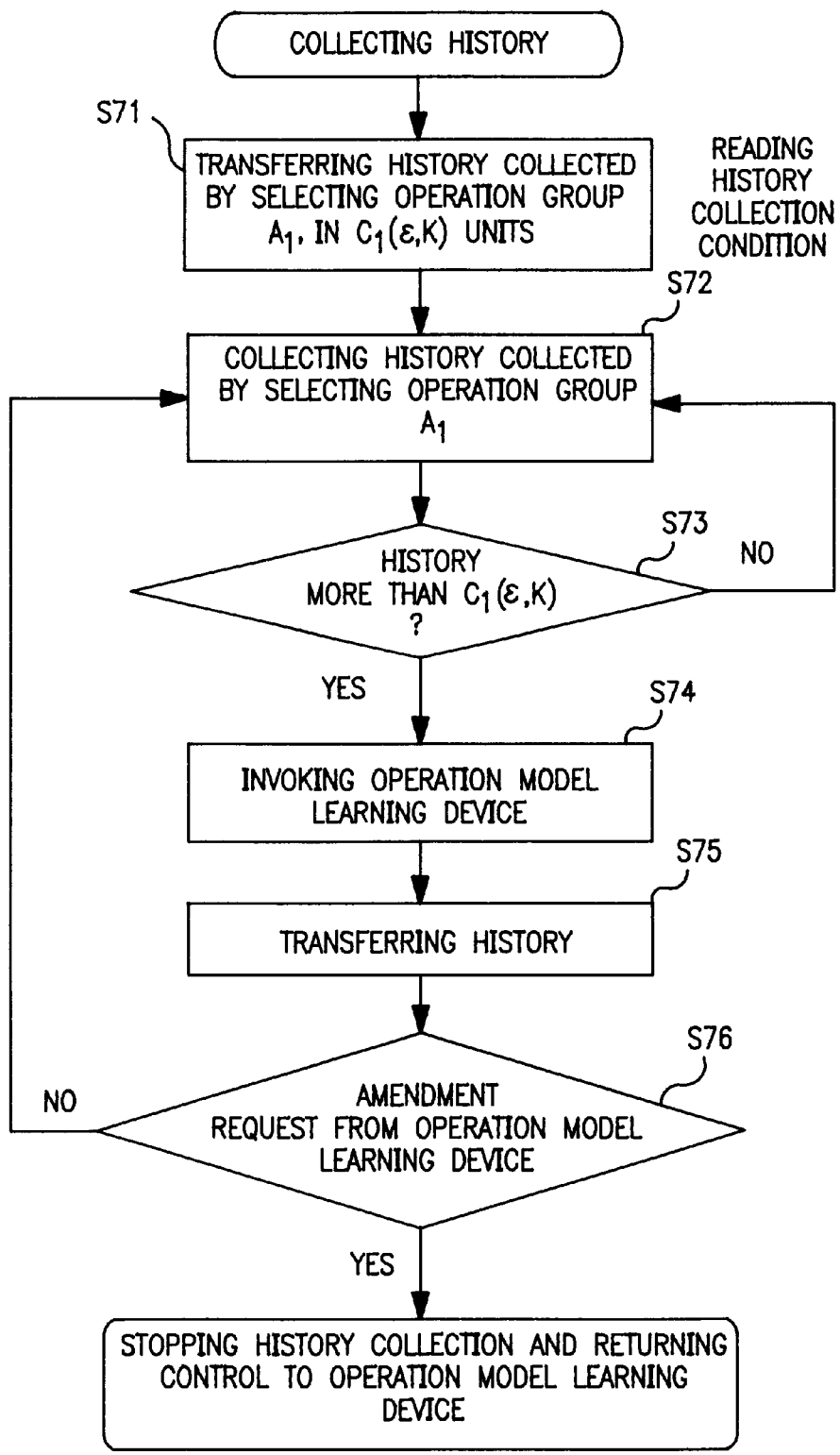
FIG. 11 is a flowchart (1) showing the operation of the operation history collecting device.

FIG. 11 is a flowchart showing the operation of the operation history collecting device 14.

In FIG. 11, the operation history collecting device 14 reads the history collecting conditions at the request of the operation model learning device 16 (step S71). According to the conditions in this process, the operation history of the selecting operation group $A_1$ is collected and transferred in the unit of $C_1(\epsilon, K)$.

Then, the selecting operation group $A_1$ is monitored and the user operation history is recorded (step S72). When the length of the operation history $\{x_n^{(i)}\}$ reaches $C_1(\epsilon, K)$ ("yes" in step S73), the operation model learning device 16 is invoked (step S74) and the collected operation history is transferred (step S75). The transferred operation history is marked with the number i of transfer (i=1, 2, ... ).

If the length of the operation history does not reach $C_1(\epsilon, K)$ ("no" in step S73), then the operation history is recorded until it reaches $C_1(\epsilon, K)$ (step S72). When the operation history collecting device 14 receives a modification request ("yes" step S76), it stops collecting the operation history and control is returned to the operation model learning device 16.

Figure 12:
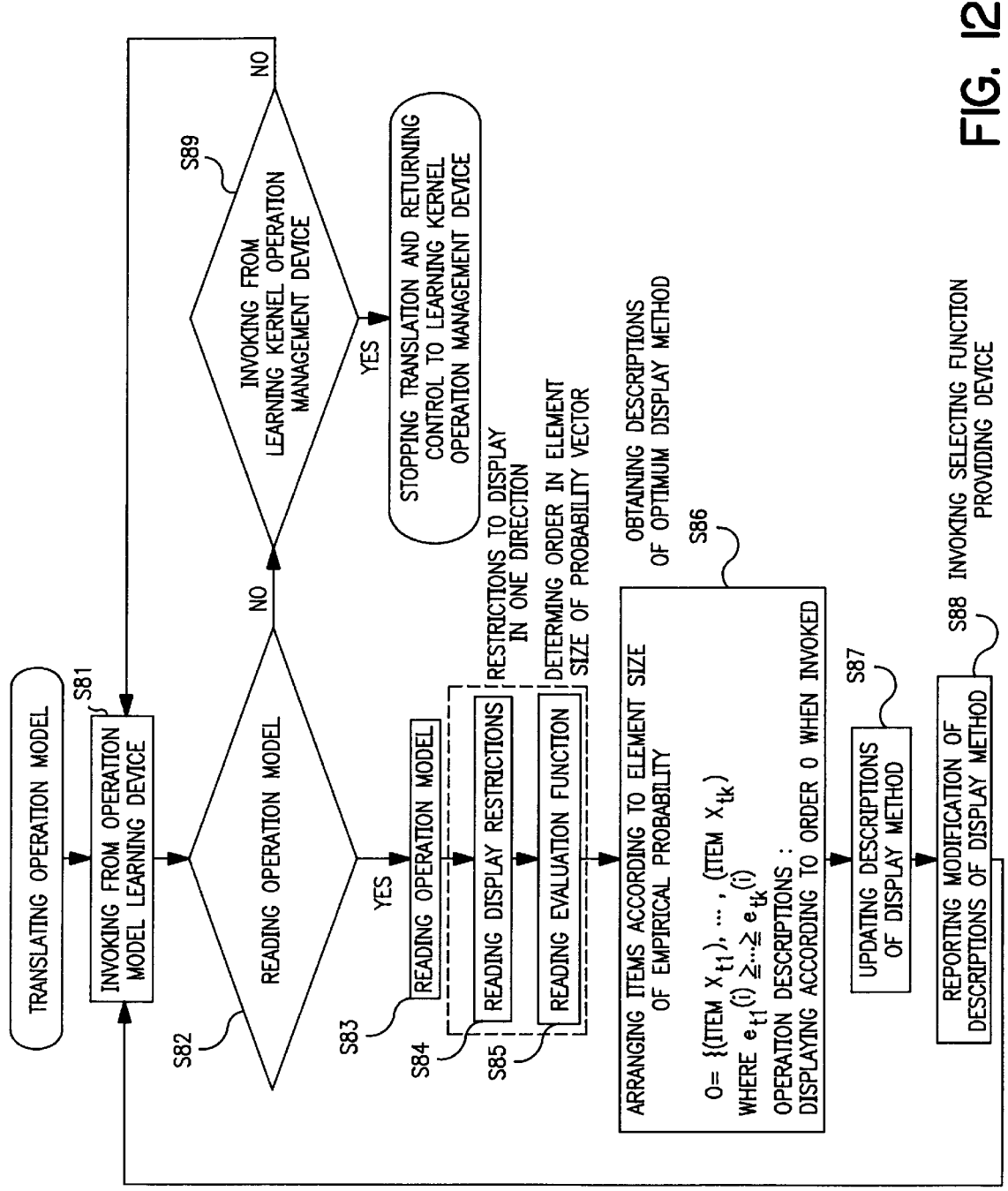
FIG. 12 is a flowchart (2) showing the operation of the operation model translating device.

FIG. 12 is a flowchart showing the operation of the operation model translating device 17.

In FIG. 12, the operation model translating device 17 in the standby state (step S81) in invoked by the operation model learning device 16 (yes in step S82) and reads a new operation model (step S83).

Then, the display restrictions and evaluation function are read (steps S84 and S85). The display restrictions are one-dimensional restrictions to display the selection items in one direction. The evaluation function is used to arrange the j-th element of the empirical probability in the display order of the item $X_j$, According to the read display restrictions and evaluation function, the optimum descriptions of the display method are generated for the selecting operation group $A_1$ (step S86). In this process, the display order is described such that items are arranged from the largest element value of the empirical probability vector. The leading item requires the lowest cost in the selecting operation while the trailing item requires the highest cost.

The generated descriptions are, for example, {(item $X_{t1}$), (item $X_{t2}$), ..., (item $X_{tk}$)}, where {t1, t2, ..., tK} is a substitute for {1, ..., K}. With $\hat{e}_{t1}^{(i)} \geq \hat{e}_{t2}^{(i)} \geq ... \geq \hat{e}_{tk}^{(i)}$, the order of each item for the description {(item $X_{t1}$), (item $X_{t2}$), ..., (item $X_{tk}$)} reflects the order of each element $\hat{e}_j^{(i)}$ of the i-th empirical probability vector. The description is formatted to accept the selecting function providing device 13.

Thus, the description of the display method of the selecting operation group $A_1$ is updated (step S87), reported to the selecting function providing device 13 (step S88), and the operation model translating device 17 returns to the standby state (step S81).

If the operation model translating device 17 receives no call from the operation model learning device 16 ("no" in step S82) but receives a call from the learning kernel operation management device 18 ("yes" in step S89), then it stops translating the operation model and control is returned to the learning kernel operation management device 18. If the operation model translating device 17 receives no call from the learning kernel operation management device 18 ("no" in step S89), it remains in the standby state (step S81).

Figure 13:
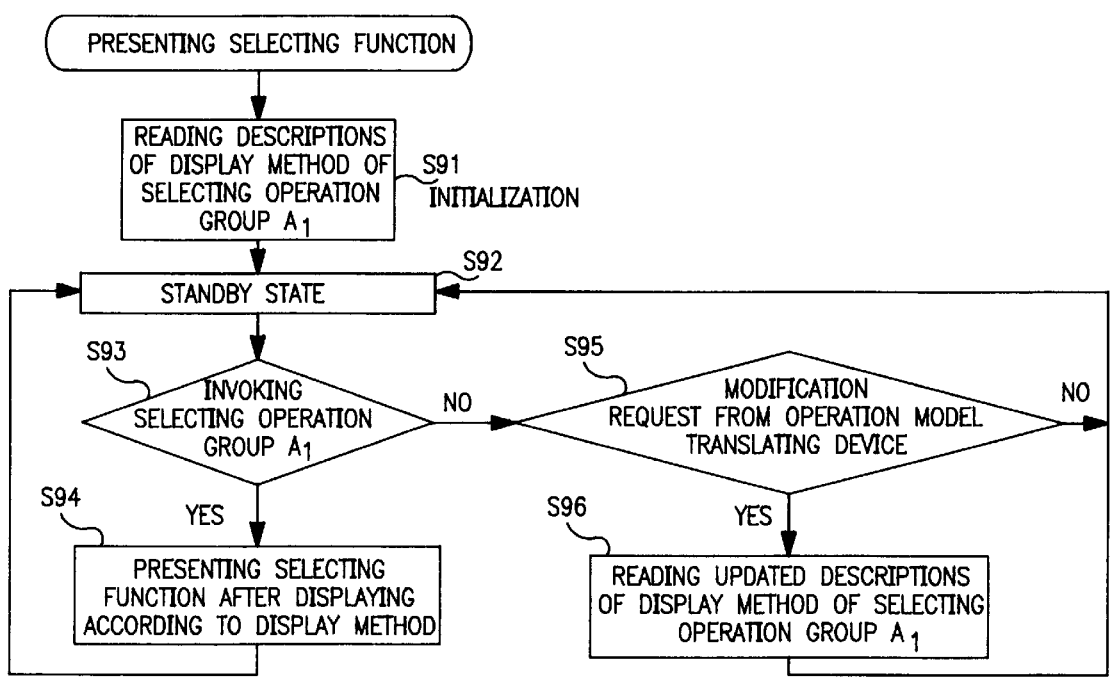
FIG. 13 is a flowchart (1) showing the operation of the selecting function providing device.

FIG. 13 is a flowchart showing the operation of the selecting function providing device 13.

In FIG. 13, the selecting function providing device 13 reads a new description of the display method for the selecting operation group $A_1$ from the operation model translating device 17 (step S91) in preparation for a selection item presentation request from the operator, and then enters the standby state (step S92).

If it receives a request to display a selection item of the selecting operation group $A_1$ from the operator ("yes" in step S93), then it displays the selection item according to the read description of the display method, provides the operator with the selecting operation function (step S94), and returns to the standby state (step S92).

If the selecting function providing device 13 receives no request to display the selection item of the selecting operation group $A_1$ ("no" in step S93) and receives a request to modify the description from the operation model translating device 17 ("yes" in step S95), then it reads the updated description of the display method of the selecting operation group $A_1$ from the operation model translating device 17 (step S96) and returns to the standby state (step S92). If it receives no modification request from the operation model translating device 17 ("no" in step S95), then it remains in the standby state (step S92).

If a completely independent operation model is used, then the operation model, the description based on the operation model, and the display format are updated each time $C_1(\epsilon, K)$ operation histories are collected. After $[2/C_1(\epsilon, K)\epsilon^2]$ ln $(2K/\epsilon)$ updates, the selection item display system 11 can provide at a high probability of $1-\epsilon$ the selecting operation group $A_1$ with the selecting operation function in which the deviation from the optimum average operation amount does not exceed $\epsilon K^2(K-1)$. ln indicates a natural logarithm loge. Normally, the logarithm can have a base smaller than e. The conclusion can be obtained as follows.

If the probability structure of the selecting operation group $A_1$ is not modified, the histories are collected and operation models are updated to realize the optimum operation amount. In this example, the display format is limited to a one-dimensional format. Therefore, the optimum display method is described to simply display the order corresponding to the elements of the empirical probability vector.

Calculated below is the optimum average time of operations obtained when selection items $X_1, \ldots, X_K$ are arranged in the one-dimensional direction. The costs required for the selecting operations are 1, 2, ..., K for each of the items starting with the leading item displayed. It can be assumed for simplicity that the condition $1 > P(X_1) \geq \ldots \geq P(X_K) > 0$ exists for the probability $P(X_1), \ldots, P(X_K)$ at which the items $X_1, \ldots, X_K$ are selected.

If $\tau$ is a substitution for $\{1, 2, \ldots, K\}$, the optional substitution $\tau$ can be assigned to the following equation.

$$\Sigma_{i=1}^{K}[\tau(i)P(X_i) - i\,P(X_i)] \geq 0 \qquad (4)$$

where $\tau(i)$ indicates a value of the i-th element in the substitution $\tau$.

Equation (4) explains that for the optional substitution $\Sigma$ the value of $\Sigma_{i=1}^{K} \tau(i) P(Xi)$ is not smaller than the value of $\Sigma_{i=1}^{K} iP(Xi)$, indicating that the optimum average operation amount obtained when the selection items are arranged in one direction is $\Sigma_{i=1}^{K} iP(Xi)$. Equation (4) is demonstrated as follows.

First, it is clear that equation (4) is established when K=1. When K=2, {1, 2} can be constantly substituted for {1, 2} and therefore the substitution of {2, 1} for {1, 2} is considered for $\tau$. At this time, the following equation is established.

$$\Sigma_{i=1}^{2}[\tau(i)P(X_i)-P(X_i)]=P(X_i)-P(X_2)\geq 0 \tag{5}$$

Thus, existence of equation (4) can be demonstrated.

When K=n and the k-th element is exchanged with the j-th element in n elements, the following equation is demonstrated and equation (4) is established.

$$\Sigma_{i=1}^{n}[\tau(i)P(X_i)-i\,P(X_i)]=(k-j)(P(X_i)-P(X_j)-P(X_k))\geq 0 \tag{6}$$

K=n+1 is applied assuming that K=n and equation (4) is established.

If $\tau^{(n)}$ is an optional substitution for {1, 2, ... ,n} and if $\tau^{(n+1)}$ is an optional substitution for {1, 2, ... , n+1}, then an optional $\tau^{(n+1)}$ can be represented on the basis of the compatibility between $\tau^{(n)}$ and {j,j+1} ($1\leq j\leq n$). Since the following equation (7) is established, equation (8) can be obtained.

$$\sum_{i=1}^{n}[\tau^{(n)}(i)P(X_i) - iP(X_i)] \geq 0 \tag{7}$$

$$(\tau^{(n)}(1)-1)P(X_1) + (\tau^{(n)}(2)-2)P(X_2) + \ldots + (\tau^{(n)}(n)-n)P(X_n) + ((n+1)-(n+1))P(X_{n+1}) \geq 0 \tag{8}$$

Selecting an optional value j generated the following equation (9).

$$(\tau^{(n)}(j) - j)P(X_j) = ((n+1)-j)P(X_j) + (\tau^{(n)}(j)-(n+1))P(X_j) \tag{9}$$

This can be transformed into the following equation (10).

$$((n+1)-(n+1))P(X_{n+1}) = \tag{10}$$
$$(\tau^{(n)}(j)-(n+1))P(X_{n-1}) + ((n+1)-\tau^{(n)}(j))P(X_{n+1})$$

This is substituted for the left part of equation (8) as follows.

$$(\tau^{(n)}(1)-1)P(X_1) + (\tau^{(n)}(2)-2)P(X_2) + \ldots - ((n+1)-j)P(X_j) + \tag{11}$$
$$\ldots + (\tau^{(n)}(j)-(n+1))P(X_{n-1}) + ((n+1)-\tau^{(n)}(j))(P(X_{n-1})-P(X_j))$$

According to equation (11), the following equation (12) is obtained.

$$(\tau^{(n)}(1)-1)P(X_1) + (\tau^{(n)}(2)-2)P(X_2) + \ldots + \tag{12}$$
$$((n+1)-j)P(X_j) + \ldots + (\tau^{(n)}(j)-(n+1))P(X_{n+1}) \geq$$
$$((n+1)-\tau^{(n)}(j))(P(X_j)-P(X_{n+1}))$$

The left part of equation (12) is represented as the following equation (13) by substituting n+1 for an optional value j ($1\leq j\leq n$) in {1, 2, ... , n+1}, and $\tau^{(n+1)}$ is assigned as follows.

$$\Sigma_{i=1}^{n-1}[\tau^{(n+1)}(i)P(X_i)-iP(X_i)] \tag{13}$$

Since equation (14) is established, the right part of equation (12) is not negative.

$$1>P(X_1)\geq P(X_2)\geq \ldots \geq P(X_{n+1})>0 \tag{14}$$

Thus, equation (4) is established when K=n+1 and therefore the induction demonstrates equation (4) using an optional value K.

When an $\epsilon$ approximation is applied to the object distribution of the empirical probability vector, it can be confirmed that the largest deviation from the optimum average operation amount can be at the most $\epsilon K^2 (K-1)$, if the average operation amount is obtained using the display method in the order according to the empirical probability vector.

If the i-th element of the empirical probability vector $\hat{P}$ refers to $\hat{P}i$, then $\hat{P}=(\hat{P}_1, \hat{P}_2, \ldots, \hat{P}_K)$ refers to an $\epsilon$ approximation to the probability vector $P=(P_1, P_2, \ldots, P_K)$, that is, max $(|pi-\hat{p}i|)\leq \epsilon$ with i ($1\leq i\leq K$).

If the display order of the selection items $X_1$ through $X_K$ is determined by the empirical probability vector, the resultant order may be erroneous. When the probabilities (frequency) $p_i$ and $p_j$ of selecting items $X_i$ and $X_j$ indicate $|p_i-p_j|>2\epsilon$, the order determination according to the empirical probability produces no error in the order between $X_i$ and $X_j$.

However, if $|p_i-p_j|>2\epsilon$, the order between $X_i$ and $X_j$ may be erroneous. In this case, the absolute value of the balance between the frequencies of two optional items including $X_i$ and $X_j$ is equal to or smaller than $2\epsilon$.

Assume that, for simplicity, the selection probability $p_1, \ldots, p_K$ for item $X_1, \ldots, X_K$ represents $p_1 \geq \ldots \geq p_K$. At this time, the deviation D from the optimum average operation amount by the exchange of order is calculated by the Following equation.

$$D=\Sigma_{i=1}^{K}(\tau(i)-i)p_i \tag{15}$$

where $\tau$ indicates an optional substitution. The problem is to calculate the upper limit of the deviation D generated in the order determined by the empirical probability.

Given below is a simple example. When two adjacent items j and j+1 are exchanged in order, the following equation is established.

$$D = ((j+1)-j)p_j + (j-(j+1))p_{j+1} \tag{16}$$
$$= p_j - p_{j+1}$$
$$\leq 2\varepsilon$$

If two items j and j+2 are exchanged in order, the following equation is established.

$$D=2(p_j-p_{j+2})\geq 4\epsilon \tag{17}$$

Normally, the maximum value $2\epsilon(K-1)$ of the deviation from the exchange is generated when items $X_1$ and $X_K$ are mistakenly exchanged in order. The maximum value of the deviation generated by mistakenly exchanging the order between n items is $2\epsilon n(K-1)$ at the largest. The number of sets of wrong-order items is K/2 sets at the largest.

Therefore, the upper limit of the deviation D generated by the order determination according to the empirical probability vector is $\epsilon K^2(K-1)$ at the largest.

Then, the sample amount required which is sufficient to assert that the empirical probability vector is an $\epsilon$ approximation to the object distribution is calculated using the probability $1-\epsilon$.

Since each item is selected independently, calculating the empirical probability for each item by obtaining a sufficiently long operation history guarantees, by the law of large numbers, an approximation of precise selection probability. The problem is to practically obtain a sufficiently long operation history. In this embodiment, Hoeffding's inequality (D. Pollard, Convergence of Stochastic Processes, Springer-Verlag, 1984.) is referred to.

With independent probability variables $Y_1, Y_2, \ldots, Y_m$, the average value of the variables is 0 and the range of the variables is $a_i \geq Y_i \geq b_i$. At this time, the Hoeffding's inequality ($\epsilon > 0$) is established as follows.

$$\text{Prob}\{|Y_1 + \ldots + Y_m| \geq \epsilon\} \geq 2\exp\{-2\epsilon^2/\Sigma_{i=1}^m (b_i - a_i)\} \tag{18}$$

For example, the item $X_j$ is considered. The independent variable string $\{Y_i^{(j)}\}$ ($1 \leq i \leq m$) relating to the selecting operation for item $X_j$ is generated from the selection history string $x_1, x_2, \ldots, x_m$. If the i-th selection refers to $X_j$, then $Y_i^{(j)} = 1 - P(X_j)$ or $Y_i^{(j)} = -P(X_j)$.

If equation (18) is used for $\{Y_i^{(j)}\}$, the following equation is established.

$$P \text{ rob}\{|(1/m)\Sigma_{i=1}^m \sigma(x_i, j) - P(X_j)| \geq \epsilon\} \leq 2\exp(-2\epsilon^2/m) \tag{19}$$

If the following equation (20) is substituted for the right part of equation (19), then m is described as follows in equation (21).

$$2\exp(-2\epsilon^2/m) \leq \epsilon \tag{20}$$

$$m \geq (2/\epsilon^2) \ln(2/\epsilon) \tag{21}$$

To successfully estimate $P(X_j)$ with the precision of $\epsilon$ at the probability equal to or higher than $1-\epsilon$, the empirical selection probability $(1/m) \Sigma_{i=1}^m \sigma(x_i, j)$ should be calculated. using at least $(2/\epsilon^2) \ln (2/\epsilon)$ operation histories.

In this embodiment, the selection probability of precision $\epsilon$ should be estimated simultaneously for K items according to one operation history at the probability equal to or higher than $1-\epsilon$. Since equation (22) is established for $K \geq 1$, the number of operation histories can be $(2/\epsilon^2)$ in $(2K/\epsilon)$.

$$(1-\epsilon/K)^K \geq 1-\epsilon \tag{22}$$

Since the operation history is transferred for each $C_1(\epsilon, K)$, the required transfer number is $(2/C_1(\epsilon, K) \epsilon^2) \ln (2K/\epsilon)$.

Next, the number of operation histories to be collected is checked when they are sequentially collected. In the present embodiment, they are collected in the format of the function $C_1(\epsilon, K)$. The function $C_1(\epsilon, K)$ is determined by the two following methods.

The first method relates to the $x^2$ check in the statistics. According to the past experiences and logic of the $x^2$ check, the distribution of $x^2$ provides a desired approximation for the exact distribution of $\Sigma(n_i - e_i)^2/e_i$ if $e_i \geq 5$ and $K \geq 5$ for the value i ($1 \leq i \leq K$).

Assuming that $p_i$ indicates the selection frequency of item $X_i$ and m indicates the length of the operation history, $e_i = m p_i$ ($a \leq i \leq K$) is established and $n_i$ indicates the number of items $X_i$ contained in the m operation histories.

The length of the operation history required by the desired $x^2$ check is at least Kmax $(5/p_i)$. Since the order should be determined through the approximation, the minimum value of the selection probability is assumed to be $\epsilon$ to obtain the collection unit of $C_1(\epsilon, K) = 5K/\epsilon$.

The second method is to assume an even distribution for K items. Optional items are extracted from the K evenly- distributed items, and the extraction is repeated until duplication arises. At this point, the expected value indicating the number of the extracting processes which stops at the duplication is $(K)^{1/2}$. If the distribution indicates any deviation, the expected value is smaller than $(K)^{1/2}$. The duplication refers to the re-extraction of an item which has been extracted before.

Since it is anticipated that deviation arises in the operation history, the length of the operation history is reasonably set to $(K)^{1/2}$ or larger, and then considering the distribution, to $C_1(\epsilon, K) = 2(K)^{1/2}$.

Unlike the $x^2$ check method, the second method excludes the approximation precision parameter $\epsilon$ from the $C_1(\epsilon, K)$, so that the time required to obtain the effect of the support can be shortened and the collection unit refers to a statistical significance.

Described below by referring to FIGS. 14 through 20 is the operation of the selection item display system 11 performed when the time-invariant Markov model is used as an operation model.

In this case, the learning kernel operation management device 18 and the system manager or user describe the basic operation file as follows.

The selection item display system 11 provides the learning function for the selecting operation group $A_1$ which comprises K items from item $X_1$ to item $X_K$. A learning model is a probability approximation learning model for use in anticipating for a time-invariant Markov model, and the approximation precision is $0 < \epsilon < 1$.

In the operation history generated by the user-selected operation in the selecting operation group $A_1$, the selection frequency of each item alters with what is selected initially. The operation model is represented as the transition probability matrix $\{P_{ij}\} = \{P(X_i \rightarrow X_j)\}$ ($1 \leq i, j \leq K$). $P_{ij} = P(X_i \rightarrow X_j)$ indicates the transition probability from item $X_i$ to item $X_j$. The sum $\Sigma_{j=1}^k P_{ij}$ of the transition probability from selection item $X_i$ to another item is "1", and $P_{ij} > 0$ ($1 \leq i, j \leq K$).

K selection items are assigned the display restrictions to develop and display the items in a one-dimensional direction. The cost paid by the user in the selecting operation is represented by a natural number indicating the display order of the selection items. The selecting function providing device 13 sequentially displays the items in the one-dimensional direction from item $X_1$ to item $X_K$, allowing the user to be provided with the selecting operation function. This display method is modified each time $C_2(\epsilon, K)$ selecting operation histories are collected.

The difference from the above described independent model is the difference in probability model for generating a selection history. In the present example, a time-invariant Markov model is used as a rule (D. Freedman Merkov Chain, Holden-Day, 1971).

The selection item display system 11 is activated at the above described initialization.

Figure 14:
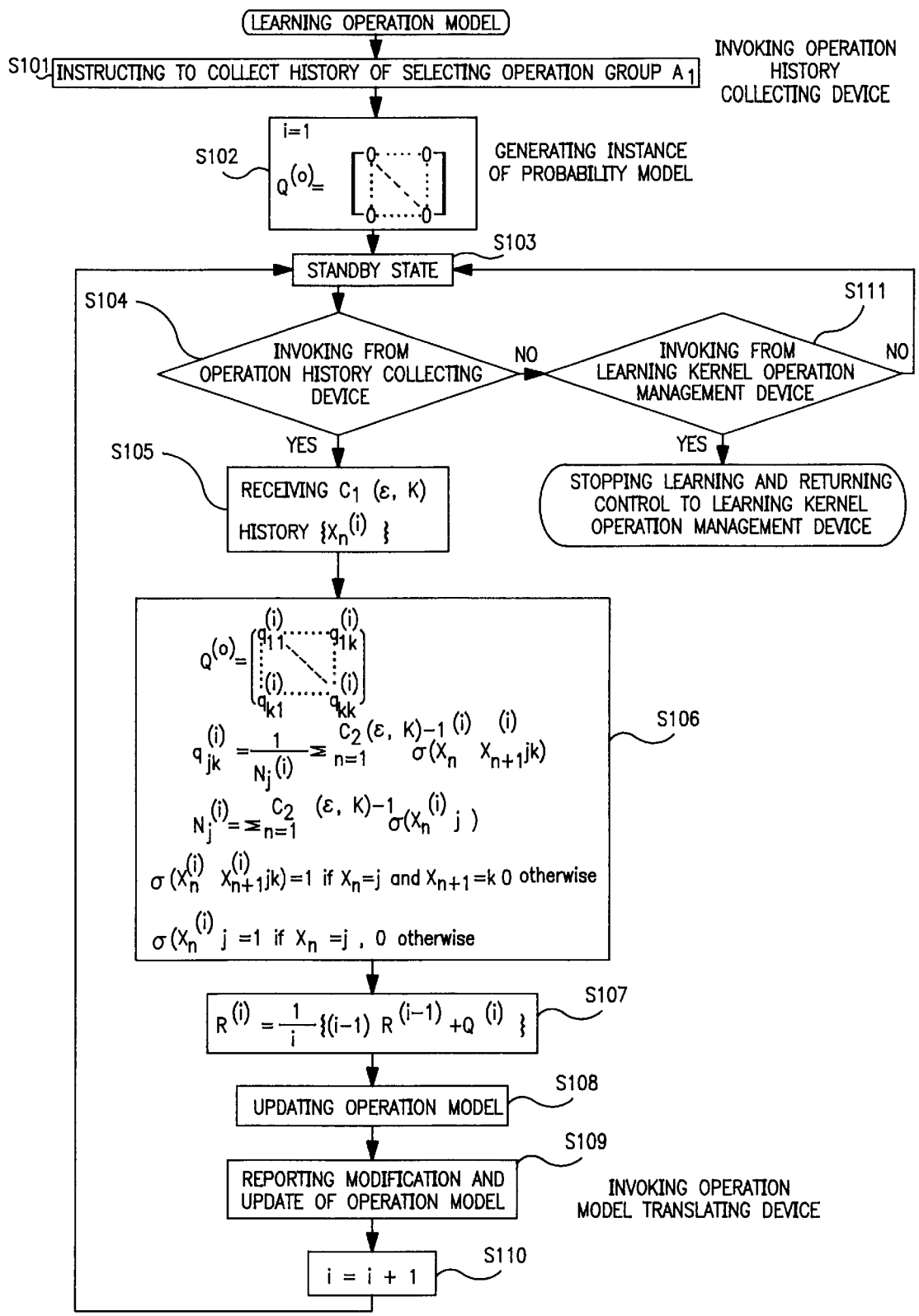
FIG. 14 is a flowchart (3) showing the operation of the operation model learning device.

FIG. 14 is a flowchart showing the operation of the operation model learning device 16.

In FIG. 14, the operation model learning device 16 requests the operation history collecting device 14 to collect operation histories, and specifies the transfer of the operation histories in the length of $C_2(\epsilon, K)$ histories as the transfer unit (step S101).

Assuming that i=1 and the initial empirical transition probability matrix $\hat{Q}^{(0)}$ is represented by the following equation.

$$\hat{Q}^{(0)} = \begin{bmatrix} 0 & \cdots & \cdots & \cdots & 0 \\ \vdots & \ddots & & & \vdots \\ \vdots & & \ddots & & \vdots \\ \vdots & & & \ddots & \vdots \\ 0 & \cdots & \cdots & \cdots & 0 \end{bmatrix} \quad (23)$$

The instance of the probability model is generated for the operation model (step S102) and the operation model learning device 16 enters the standby state (step S103).

When it is invoked by the operation history collecting device 14 ("yes" in step S104), it receives the i-th operation history $\{x_n^{(i)}\}$ (i=1, 2, ...) (step S105). $x_n^{(i)}$ indicates one index in 1 through K, and the operation history $\{x_n^{(i)}\}$ consists of $C_2$ indices each corresponding to n=1, 2, ..., $C_2$ ($\epsilon$, K).

Next, the i-th empirical transition probability matrix $\hat{Q}^{(i)}$ is calculated by the following equation (step S106).

$$\hat{Q}^{(i)} = \begin{bmatrix} \hat{q}_{11}^{(i)} & \hat{q}_{12}^{(i)} & \cdots & \cdots & \cdots & \hat{q}_{1K}^{(i)} \\ \hat{q}_{21}^{(i)} & \hat{q}_{22}^{(i)} & \cdots & \cdots & \cdots & \hat{q}_{2K}^{(i)} \\ \vdots & \vdots & & & & \vdots \\ \vdots & \vdots & & & & \vdots \\ \vdots & \vdots & & & & \vdots \\ \hat{q}_{K1}^{(i)} & \hat{q}_{K2}^{(i)} & \cdots & \cdots & \cdots & \hat{q}_{KK}^{(i)} \end{bmatrix} \quad (24)$$

$$\hat{q}_{jk}^{(i)} = \frac{1}{N_j^{(i)}} \sum_{n=1}^{C_2(\epsilon,K)-1} \sigma(x_n^{(i)} x_{n-1}^{(i)}, jk) \quad (25)$$

$$N_j^{(i)} = \sum_{n=1}^{C_2(\epsilon,K)-1} \sigma(x_n^{(i)}, j) \quad (1 \le j \le K, \quad 1 \le k < K) \quad (26)$$

Each matrix element $\hat{q}_{jk}^{(i)}$ in equation (24) is calculated by equations (25) and (26). If $N_j^{(i)}=0$, then $q_{jk}^{(i)}=0$ ($1 \le k \le K$).

In equation (26), $\sigma(x_n^{(i)}, j)=1$ if $x_n^{(i)}=j$. If $x_n^{(i)} \ne j$, then $\sigma(x_n^{(i)}, j)=0$. In equation (25), $\sigma(x_n^{(i)} x_{n+1}^{(i)}, jk)=1$ if $x_n^{(i)}=j$ and $x_{n+1}^{(i)}=k$. $\sigma(x_n^{(i)} x_{n+1}^{(i)}, jk)=0$ if $x_n^{(i)} \ne j$ and $x_{n+1}^{(i)} \ne k$.

The empirical transition probability matrix (Markov matrix) $\hat{R}^{(i)}$ for all operation histories up to present is calculated by the following equation (step S107).

$$\hat{R}^{(i)} = \frac{1}{i}\{(i-1)\hat{R}^{(i-1)} + \hat{Q}^{(i)}\} \quad (27)$$

In equation (27), $\hat{R}^{(0)}$ is a zero matrix as $\hat{Q}^{(0)}$.

As shown in equation (26), $N_j^{(i)}$ indicates the number of operation history sets in which the first operation history $x_n^{(i)}$ in sets $x_n^{(i)}$ and $x_{n+1}^{(i)}$ of [$C_2$ ($\epsilon$, K)−1] serial operation histories matches j.

As shown in equation (25), $\hat{q}_{jk}^{(i)}$ indicates the rate of the number of sets, in which the first operation history $x_n^{(i)}$ matches j and the next operation history $x_{n+1}^{(i)}$ matches k, to $N_j^{(i)}$. That is, $\hat{q}_{jK}^{(i)}$ indicates the rate that item $X_K$ is selected immediately after selection item $X_j$ is selected.

As shown in equation (27), the element $\hat{r}_{j,k}^{(i)}$ of the j-th row at the k-th column of the Markov matrix $\hat{R}^{(i)}$ indicates the average value of the $\hat{q}_{jk}^{(i)}, \ldots, \hat{q}_{jK}^{(i)}$. Therefore, the element of the j-th row at the k-th column of the Markov matrix $\hat{R}^{(i)}$ indicates an average rate that item $X_K$ is selected immediately after item $X_j$ is selected in the previous operation represented by the first through the i-th operation history.

If the i-th Markov matrix $\hat{R}^{(i)}$ has been calculated, the operation model learning device 16 updates the operation model, according to the result of the calculation (step S108), and reports the update to the operation model translating device 17 (step S109). Then, it increments i (step S110), and enters the standby state (step S103).

If the operation model Learning device 16 is not invoked by the operation history collecting device 14 ("no" in step S104), but is invoked by the learning kernel operation management device 18 ("yes" in step S11), then it stops learning the operation histories and control is returned to the learning kernel operation management device 18. If the operation model learning device 16 is not invoked by the learning kernel operation management device 18 ("no" in step S111), then it remains in the standby state (step S103).

Figure 15:
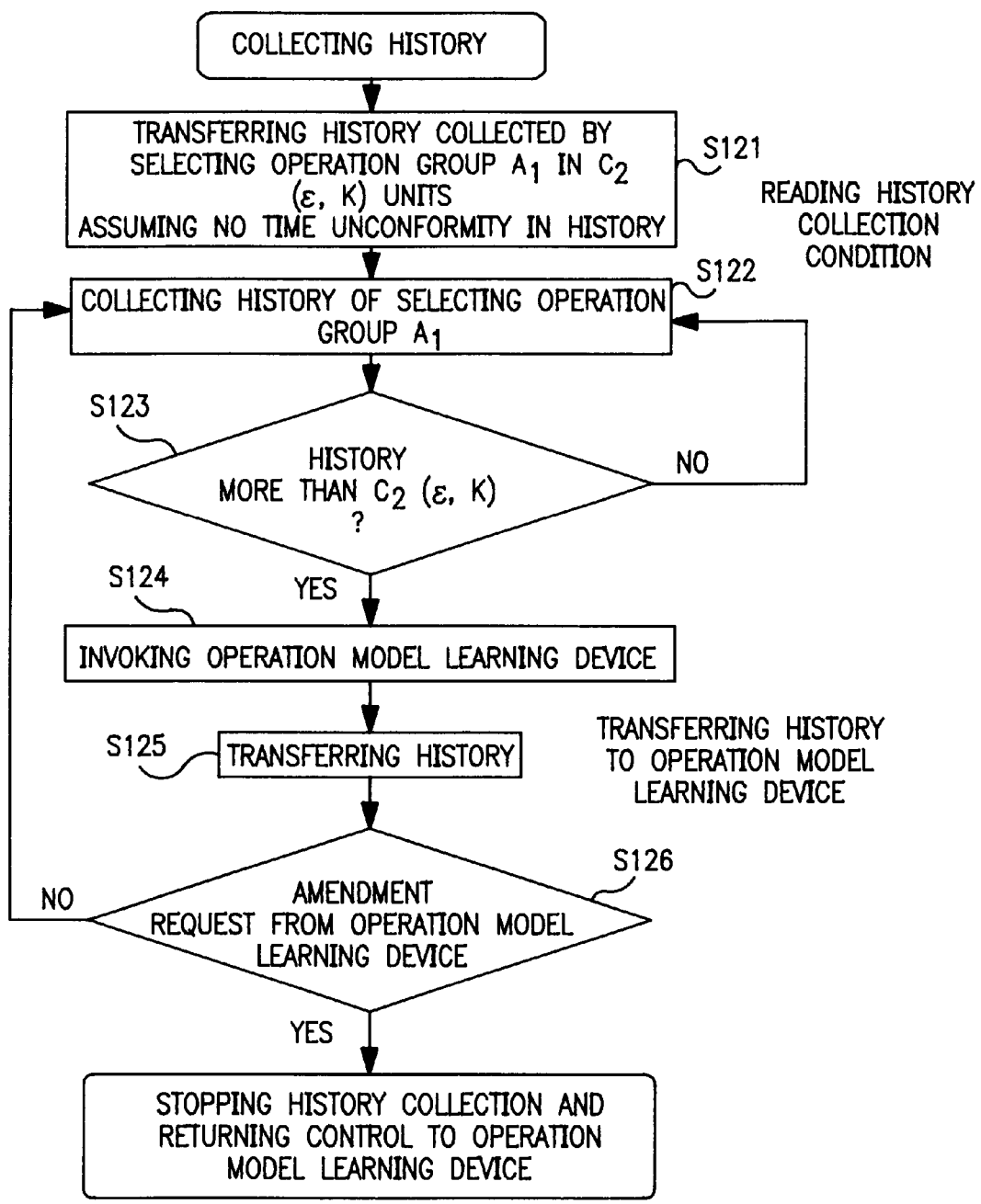
FIG. 15 is a flowchart (2) showing the operation of the operation history collecting device.

FIG. 15 is a flowchart showing the operation of the operation history collecting device 14. The operations in steps S121, S122, S123, S124, S125, and S126 are fundamentally the same as those in steps S71, S72, S73, S74, S75, and S76.

In step S121, the operation history is transferred in the unit of $C_2$ ($\epsilon$, K) and no time incompatibility is detected in $C_2$ ($\epsilon$, K) operation histories. The operation histories xn p(i) are arranged in time order.

In step S122, the operation histories of collected selecting operation group $A_1$ indicating which items have been selected, are transferred to the selecting function providing device 13.

In step S123, it is determined whether or not the length of the operation history $\{x_n^{(i)}\}$ has reached $C_2$ ($\epsilon$, K).

Figure 16:
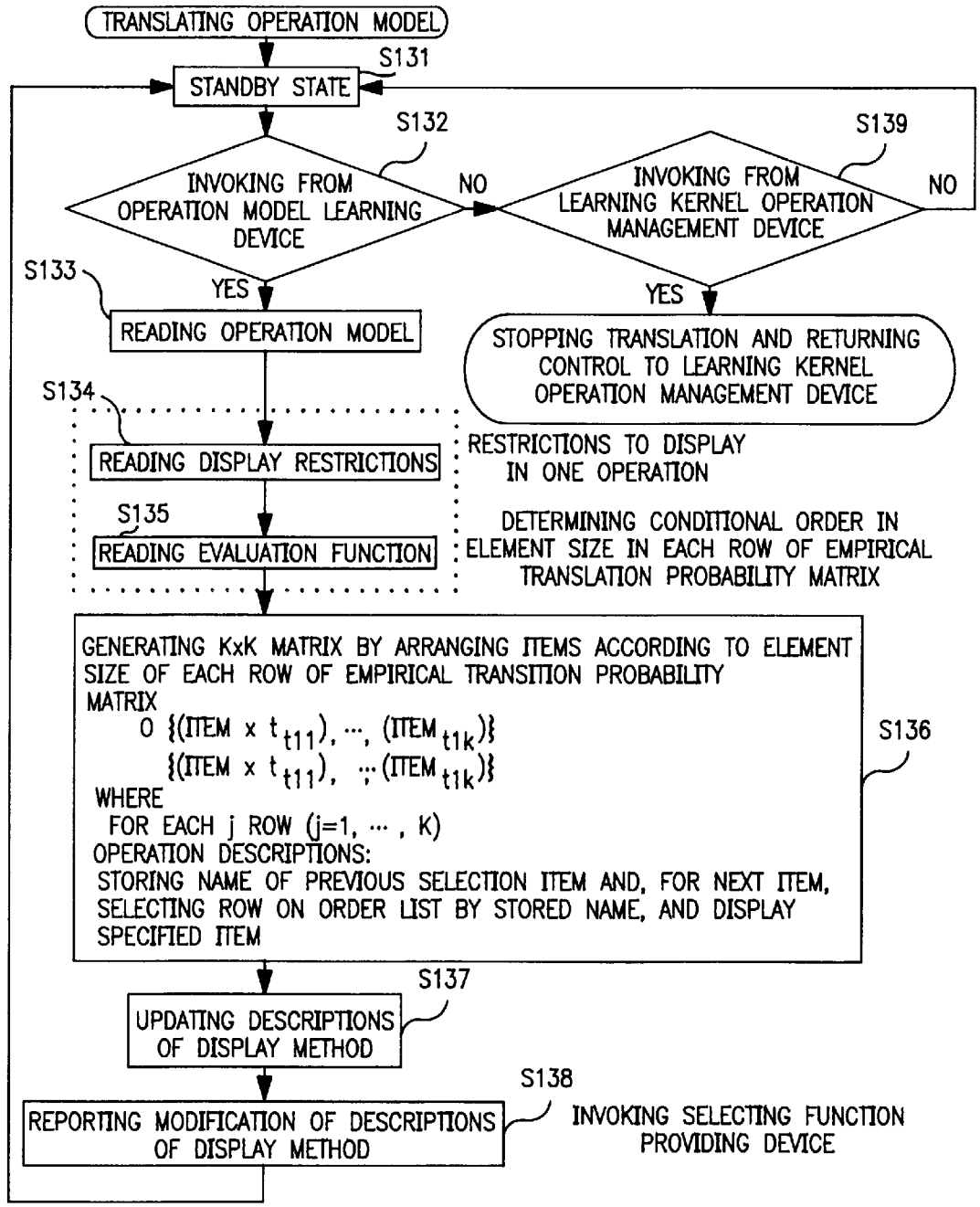
FIG. 16 is a flowchart (3) showing the operation of the operation model translating device.

FIG. 16 is a flowchart showing the operation of the operation model translating device 17.

In FIG. 16, the operation model translating device 17 in the standby state (step S131) is invoked by the operation model learning device 16 ("yes" in step S132) to read a new operation model (step S133).

Then, a display restriction and evaluation function are read (steps S134 and S135). The display restriction is a one-dimensional restriction to display selection items in one direction. The evaluation function is a function for use in converting an element at the h-th column in each row of the Markov matrix $\hat{R}^{(i)}$ into the display order of the item $X_h$.

Next, according to the read display restriction and evaluation function, the optimum display method for the selecting operation group $A_1$ is described (step S136). In this example, the display order of the selection items is determined using each row of the Markov matrix $\hat{R}^{(i)}$.

Practically, the display order is described such that, in each row of $\hat{R}^{(i)}$, the selection items are arranged in order from largest to smallest in the values of K elements in the 1st row through the K-th row. An item arranged faster costs less in the selecting operation. Each row in $\hat{R}^{(i)}$ corresponds to the item $X_j$ selected previously.

Figures 17, 18:
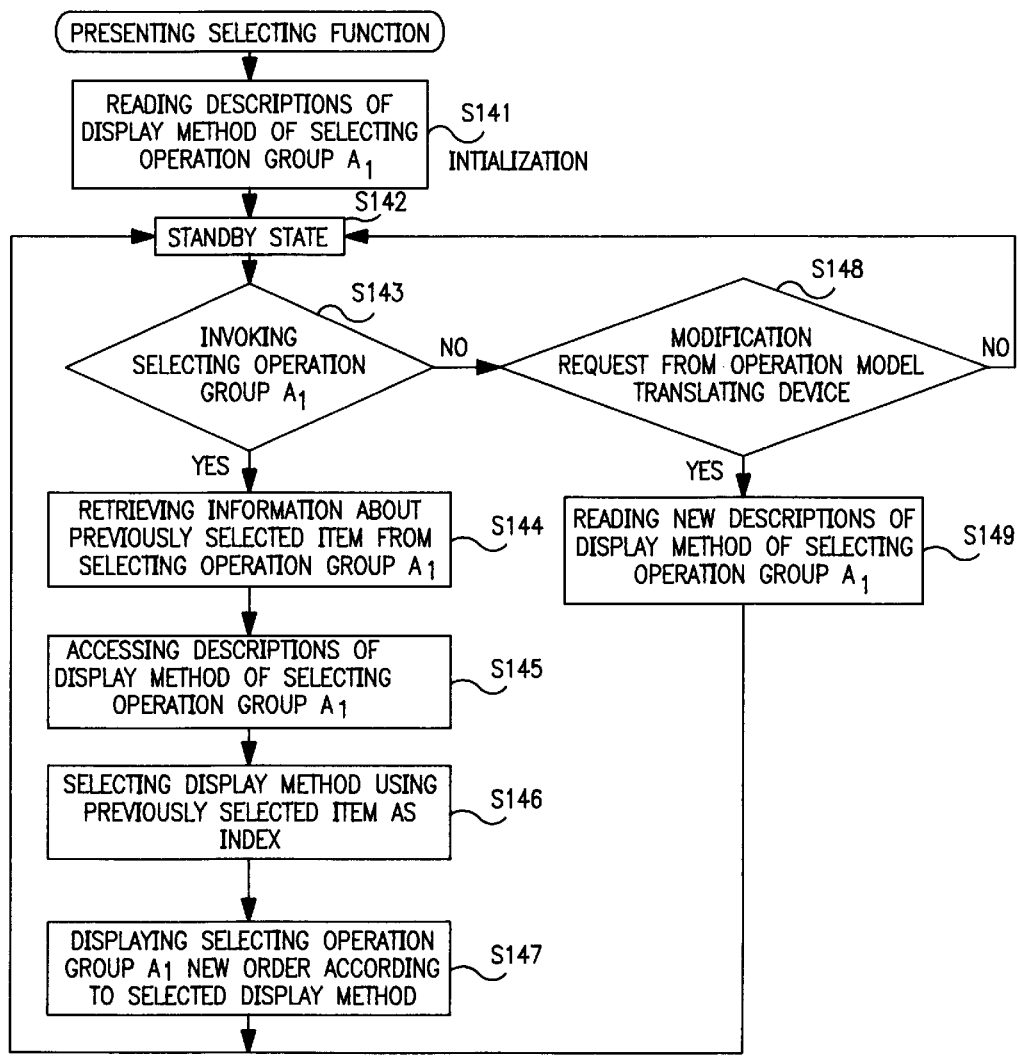
FIG. 17 shows an example (1) of the descriptions of the display method.
FIG. 18 is a flowchart (2) showing the operation of the selecting function providing device.

The generated description is displayed in, for example, the table format as shown in FIG. 17 corresponding to the Markov matrix $\hat{R}^{(i)}$. The j-th row (j=1, ..., K) in FIG. 17 indicates the display order of each item, for example, {(item $X_{tj1}$), (item $X_{tj2}$), ..., (item $X_{tjK}$)} in the subsequent display screen after the item $X_j$ has been selected in the previous selecting operation. {tj1, tj2, ..., tjK} is one of the substitutions for {1, ..., K}.

Assuming that $\hat{r}_{j,tj1}^{(i)} \ge \hat{r}_{j,tj2}^{(i)} \ge \ldots \ge \hat{r}_{j,tjK}^{(i)}$, the order of each item in the j-th row {(item $X_{tj1}$), (item $X_{tj2}$), ..., (item $X_{tjK}$)} in the description shown in FIG. 17 reflects the order of the size of each element $\hat{r}_{j,h}^{(i)}$ in the j-th row of the empirical transition probability matrix for all of the first through the i-th operation histories.

Thus, the description of the display method of the selecting operation groups $A_1$ is updated (step S137) and reported to the selecting function providing device 13 (step S138), and the operation model translating device 17 returns to the standby state (step S131).

If the operation model translating device 17 is not invoked by the operation model learning device 16 ("no" in step S132) but is invoked by the learning kernel operation management device 18 ("yes" in step S139), then it stops translating the operation models and control is returned to the learning kernel operation management device 18. If operation model translating device 17 is not invoked by the learning kernel operation management device 18 ("no" in step S139), it remains in the standby state (step S131).

FIG. 18 is a flowchart showing the operations of the selecting function providing device 13.

In FIG. 18, the selecting function providing device 13 reads a new description of the display method of the selecting operation group $A_1$ from the operation model translating device 17 in preparation for a request from the operator to present a selection item (step S141), and then enters the standby state (step S142). At this time, the information of the previous selection result received from the operation history collecting device 14 is stored.

When the operator requests to display selection items of the selecting operation group $A_1$ ("yes" in step S143), the information of the previously selected item in the selecting operation group $A_1$ is retrieved (step S144).

Then, the selecting function providing device 13 accesses the description of the display method of the selecting operation group $A_1$ (step S145) to select the display method according to the order described in the j-th row corresponding to the index j of the previously selected item $X_j$ (step S146).

According to the selected display method, the selection items are displayed in the new display order, and the operator is provided with the selecting operation function (step S147). The selecting function providing device 13 then returns to the standby state (step S142).

If there is no request to display a selection item of the selecting operation group $A_1$ ("no" in step S143) and the operation model translating device 17 requests to amend the description ("yes" in step S148), then the selecting function providing device 13 reads the updated description of the display method of the selecting operation group $A_1$ (step S149) and returns to the standby state (step S142). If the operation model translating device 17 issues no amendment request ("no" in step S148), the selecting function providing device 1.3 remains in the standby state (step S142).

Next, an example of displaying a selection item according to a time-even Markov model is described by referring to FIGS. 19A, 19B, and 20.

FIG. 19A shows the items $X_1$, $X_2$, and $X_3$ displayed previously. FIG. 19B shows the display amended by the selection item display system 11. In FIGS. 19A and 19B, the cost of the user selecting operation is indicated in the higher order, first (1), second (2), and third (3), from the above. If each of the values is multiplied by the empirical transition probability of each item displayed for the values, the sum of the products indicates an expected value of the operation cost in the display.

At this time, the operation model learning device 16 receives the i-th operation history indicating the index 2 of the item $X_2$ selected by the user in the previous display shown in FIG. 19A (step S105 in FIG. 14). Then, it is checked whether or not the Markov matrix $\hat{R}^{(i)}$ should be amended according to the collected operation histories. If it should be amended, $\hat{R}^{(i)}$ is amended. Unless it should be amended, the $\hat{R}^{(i)}$ is stored unchanged (steps S106, S107, and S108)

FIG. 20 shows an example of the thus obtained Markov matrix $\hat{R}^{(i)}$. In FIG. 20, the value in the j-th row at the h-th column indicates the probability that the item $X_h$ is selected next time when the previous selection result is the item $X_j$. The probability is calculated based on all the collected operation histories. The operation model learning device 16 reports the Markov matrix $\hat{R}^{(i)}$ shown in FIG. 20 to the operation model translating device 17 (step S109).

According to the flowchart shown in FIG. 16, the operation model translating device 17 generates the description of the display method based on the received Markov matrix $\hat{R}^{(i)}$ and the display restrictions (steps S136 and S137 in FIG. 16). The display restrictions shown in FIGS. 19A and 19B indicate that the cursor moves upwards and downwards in the selecting operation and that one unit cost is required each time the cursor moves one item downwards.

FIG. 21 shows the description generated by the Markov matrix shown in FIG. 20. The translation result indicates that, if the previous selection result is the item $X_1$, the items $X_3$, $X_2$, and $X_1$ are displayed from the top in this order according to the value of each probability stored in the first row of the Markov matrix shown in FIG. 20. Similarly, the translation result indicates that, if the previous selection result is the item $X_2$, the items $X_1$, $X_3$, and $X_2$ are displayed from the top in this order. If the previous selection result is the item $X_3$, the items $X_2$, $X_3$, and $X_1$ are displayed from the top in this order.

The operation model translating device 17 reports the description of the display method shown in FIG. 21 to the selecting function providing device 13 (step S138).

According to the flowchart shown in FIG. 18, the selecting function providing device 13 accesses the received description of the display method using the index 2 of the item $X_2$ which is the previous selection result received by the operation history collecting device 14 (step S145).

By obtaining the display order of {item $X_1$, item $X_3$, item $X_2$} from the second row of the description of the display method shown in FIG. 21 (step S146 in FIG. 18), the selecting function providing device 13 displays the selection items as shown in FIG. 19B (step S147).

The expected value of the operation cost for the display shown in FIG. 19B can be calculated as follows using the selection probability of each item in the second row shown in FIG. 20.

$$1 \times 0.5 + 2 \times 0.3 + 3 \times 0.2 = 1.7 \tag{28}$$

The expected value of the operation cost for the display shown in FIG. 19A can be calculated as follows using the same selection probability.

$$1 \times 0.5 + 2 \times 0.2 + 3 \times 0.3 = 1.8 \tag{29}$$

Therefore, amending the display as shown in FIG. 19B can successfully reduce the operation cost.

According to the time-invariant Markov model, the operation models, the description based on the operation models, and the display format are updated each time $C_2$ ($\epsilon$, K) operation histories are collected. At this time, after $[8K/C_2 (\epsilon, K) \epsilon^2] [\ln (2K/\epsilon)]^2$ times of updating operations, selection item display system 11 can provide at a high probability of $1-\epsilon$ the selecting operation group $A_1$, with the selecting operation function such that the deviation from the optimum average operation amount does not exceed $\epsilon K^2$ (K−1). If the updating operation is continued while the operation histories are collected, the optimum operation amount can be obtained asymptotically. The conclusion is derived as follows.

If a selected item can be preliminarily notified, a row of the empirical transition matrix $\hat{R}^{(i)}$ can be retrieved as an empirical probability vector, and data can be processed as if it is a completely independent model. If the empirical probability vector which comprises as components empirical transition probabilities indicates an $\epsilon$ approximation to the object distribution, the display order is obtained according to the information and the description of the display method shown in FIG. 17 is generated to display selection items. Thus, the selecting operation function can be provided to realize the optimum average operation amount.

To make the empirical transition probability matrix an $\epsilon$ approximation to the probability matrix indicating the object distribution, the finally required length of the history is calculated based on the two following conditions.

(I) Sufficient sample amount $N=O((1/\epsilon^2) \ln (1/\epsilon))$ should be collected for at least each item and for each transition case to make each empirical transition probability an $\epsilon$ approximation.

(II) Each empirical probability vector should be an $\epsilon$ approximation. That is, an operation history should be long enough to provide at least N transition samples for each item.

First, the condition (II) specific to the model is considered. Since the time-even and restricted Markov model is considered, the ultimate distribution for $i=\infty$ is calculated as follows with each row j ($1 \leq j \leq K$) of the empirical transition probability matrix $\hat{R}^{(i)}$ where $\Sigma_{h=1}^{k} \hat{r}_{jh}^{(i)}=1$.

$$\hat{R}^{(i)} = \begin{bmatrix} K^{-1} & K^{-1} & \cdots & \cdots & \cdots & K^{-1} \\ K^{-1} & K^{-1} & \cdots & \cdots & \cdots & K^{-1} \\ \vdots & \vdots & & & & \vdots \\ \vdots & \vdots & & & & \vdots \\ \vdots & \vdots & & & & \vdots \\ K^{-1} & K^{-1} & \cdots & \cdots & \cdots & K^{-1} \end{bmatrix} \quad (30)$$

Therefore, if the observation time is long enough, it is reasonable to assume that the frequency at which the transition starting from each item is detected is equally assigned. A transition sample starting with the item $X_j$ is assumed to be detected at a probability of $1/K$ in the operation history. In this case, at least N transition samples $X_j X_h$ ($1 \leq h \leq K$) from item $X_j$ to item $X_h$ should be collected at a probability of $1-\delta_1$.

To attain this, $NK\ln(NK/\delta_2)$ transition samples should be collected according to the Coupon Collector Problem (G.M. Benedek and A Itai, Learnability with respect to fixed distributions, Theo. Camp. Sci., 86 (1991), pp. 377–389.). Thus, it has been proved that there is an opportunity that an $\epsilon$-approximate empirical transition probability matrix is obtained at a probability of $1-\delta_2$. Next, the estimation of each transition probability should simultaneously indicate an $\epsilon$ approximation at a probability of $1-\delta_1$.

$$(1-\delta_1/K^2)^{K2} \geq 1-\epsilon_1 \quad (31)$$

Since the above equation is established, the total N of the transition samples starting with each item should be larger than $(2/\epsilon^2)\ln(K^2/\delta_1)$ by using the Hoeffding equation. The request for the estimated probability is calculated as follows.

$$(1-\delta_1)(1-\delta_2) \geq 1-\epsilon \quad (32)$$

Therefore, if $\delta_1 = \epsilon/2$, $\delta_2 = \epsilon/2$, then the following equation is established.

left part of equation (32) = $(1 - \epsilon/2)^2$ $\geq 1 - \epsilon$

= right part of equation (32)

Thus, equation 32 is satisfied.

Calculating the empirical transition probability matrix $\hat{R}^{(i)}$ by collecting $(8K/\epsilon^2)[\ln (2K/\epsilon)]^2$ transition samples from the operation history indicates an $\epsilon$ approximation to a common transition probability matrix at a probability of $1-\epsilon$. Since operation histories are transferred for each of $C^2(\epsilon, K)$ operation histories, the necessary time for the transfer is $[8K/C_2(\epsilon, K) \epsilon^2][\ln (2K/\epsilon)]^2$.

The two following methods are used to check again what is the optimum unit of the operation histories when they are sequentially collected. In this example, the collection unit is represented as the function format of $C_2(\epsilon, K)$.

According to past experience and the logic of the $x^2$ check, the length required for the operation history in a desired $x^2$ check for each selection item $X_j$ is at least $K^2 \max_h (5/p_{jh})$ where $p_{jh}$ indicates the frequency at which the item $X_h$ is selected after the item $X_j$ is selected. The order is determined by the probability that one item is selected after another item. Therefore, the collection unit of $C_2(\epsilon, K)=5K^2/\epsilon$ is obtained by assuming that the minimum value of the selection frequency $p_{jh}$ is $\epsilon$.

Since $K^2$ transitions are made, it can be considered that one transition is independent from another to assume an even distribution for each transition. If a transition sample is extracted until the duplication is a detected, the expected value for the time of the extracting process is calculated as K. If there is a deviation in the transition distribution, the expected value for the time of extracting processes is smaller than K.

Since it is anticipated that a deviation is detected in the operation history, the length of the operation history is reasonably determined to be equal to or larger than K. Considtering the distribution, $C_2(\epsilon, K)=2K$.

When the history of the selecting operation can be recognized as a completely independent event, the learning kernel operation management device 18 describes the processes to modify a probability model and convert a Markov model into a completely independent model.

According to the embodiments shown in FIGS. 14 through 21, the primary Markov model is used as an operation model to estimate the probability of the item selected depending on the previous selection result. However, the present invention is not limited to this application, but uses an optional degree of a multiplexed Markov model such as a secondary Markov model for estimating the probability of a next selected item in consideration of the second previous selection result.

In the above described. embodiment, a time-even Markov model is used. However, the selection item display system 11 can support an optional selecting operation including an inconstant selecting operation in which the selection probability depends on time. An inconstant model can be an auto-regression model, auto-regressive moving average model, etc. of a higher order model of the Markov model.

FIG. 22 shows an example of an inconstant operation model. FIGS. 23A and 23B show examples of the optimum display method using the model shown in FIG. 22.

In phase T1 in FIG. 22, only selection items $X_1$ through $X_5$ are selection objects in selection items $X_1$ through $X_{15}$. Among the selection objects, the most probable item is item $X_3$, followed by items $X_2$ and $X_4$, and then items $X_1$ and $X_5$. In phase T2, only selection items $X_6$ through $X_{14}$ are selection objects in selection items $X_1$ through $X_{15}$. Among the selection objects, the most probable item is item $X_{10}$, followed by items $X_9$ and $X_{11}$, $X_8$ and $X_{12}$, and $X_7$ and $X_{13}$, and then items $X_6$ and $X_{14}$.

If the display restriction is, as shown in FIG. 3A, a one-dimensional direction, the optimal selection item in phase T1 is displayed, for example, as shown in FIG. 23A. In phase T1, since the selection probability of items $X_6$ through $X_{15}$ is 0, they need not be displayed. The selecting operation costs higher in the right direction.

The optimal selection item in phase T2 is displayed, for example, as shown in FIG. 23B. In phase T2, since the selection probability of items $X_1$ through $X_5$ and $X_{15}$ is 0, they need not be displayed.

Thus, even if the selection probability alters with time, the selecting operation can be supported by adopting an operation model which alters with correspondingly time.

Then the support method followed by the selection item display system 11 for a plurality of selecting operation groups is described by referring to FIGS. 24 through 27. Especially, the procedure for a new support request, support suspension request, etc. is described.

The operation model of each selecting operation group to be supported indicates a polynomial distribution depending on the number of display items as in the completely independent model. Practically, it is represented by a empirical probability vector. If the method shown in FIGS. 10 through 13 is applied to each of the selecting operation group including the one to be newly supported, then the optimum time of operations is guaranteed.

Figure 24:
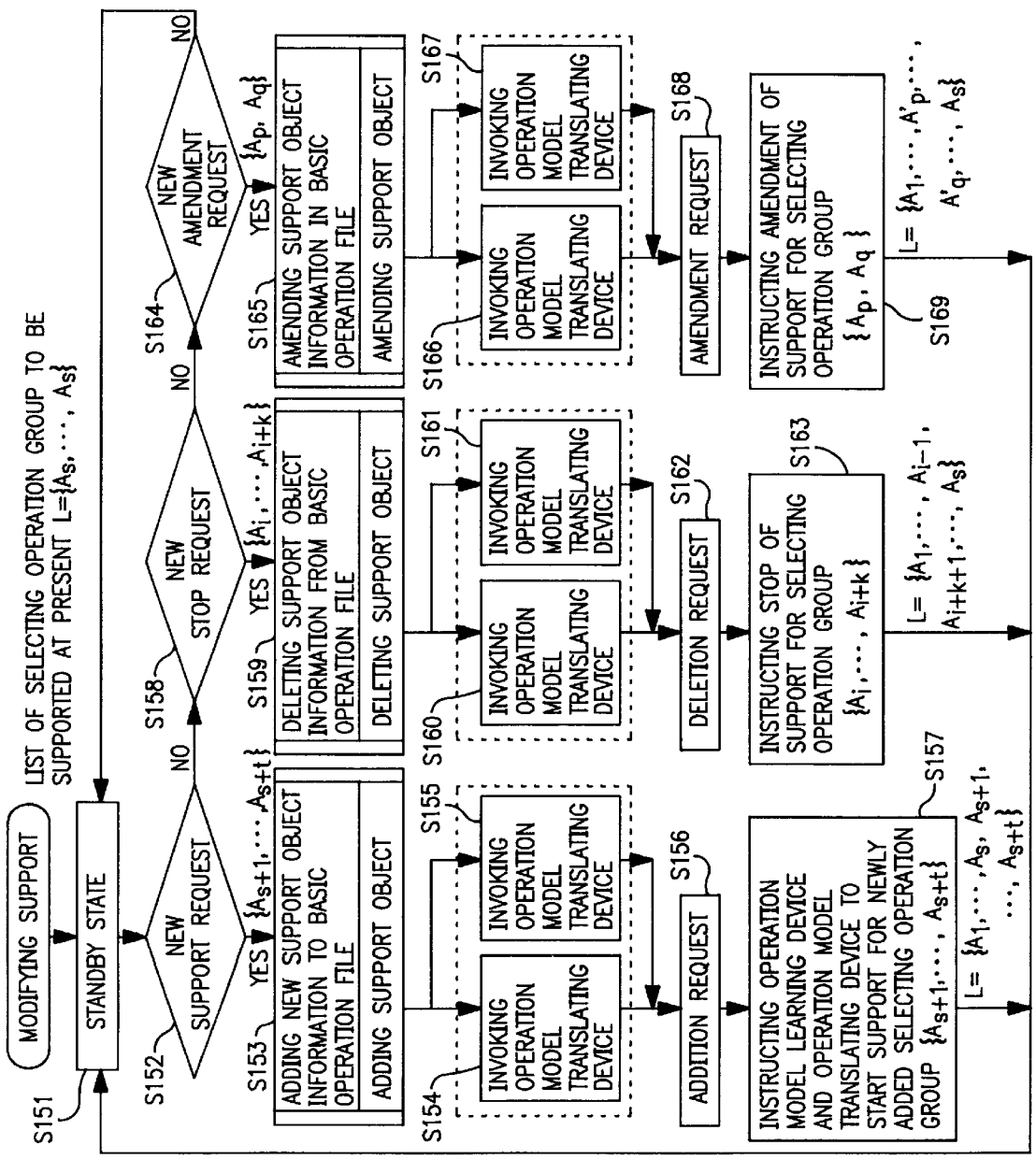
FIG. 24 is a flowchart showing the operation of the learning kernel operation management device.

FIG. 24 is a flowchart showing the operation of changing support by the learning kernel operation management device 18.

In FIG. 24, the activated learning kernel operation management device 18 usually enters the standby state (step S151).

At this time, the operation model learning device 16 and operation model translating device 17 are activated, and the support of the selecting operation group $\{A_1, \ldots, A_s\}$ described in the list L of the selecting operation groups in the basic operation file is started.

When the learning kernel operation management device 18 receives from the operator a request to support new selecting operation group $\{A_{s+1}, \ldots, S_{s+t}\}$ ("yes" in step S152), it adds the information to the basic operation file (step S153). Then the learning kernel operation management device 18 invokes the operation model learning device 16 and operation model translating device 17 (steps S154 and S155) and notifies them of the addition request (step S156). Then, it instructs the start of the support for the selecting operation groups $\{A_{s+1}, \ldots, A_{s+t}\}$ (step S157), and then enters the standby state (step S151).

The operation model learning device 16 and operation model translating device 17 start supporting the selecting operation groups $\{A_{s+1}, \ldots, A_{s+t}\}$ in response to the add request from the learning kernel operation management device 18.

When the learning kernel operation management device 18 receives from the operator a request to stop the support for the selecting operation group $\{A_i, \ldots, A_{i+k}\}$ ("yes" in step S158), it deletes the information from the basic operation file (step S159). Then, it invokes the operation model learning device 16 and operation model translating device 17 (steps S160 and S161) and notifies them of the deletion request (step S162). At this point, it specifies the stop of the support for the selecting operation groups $\{A_i, \ldots, A_{i+k}\}$ (step S163), and returns to the standby state (step S151).

If the learning kernel operation management device 18 receives from the operator a request to amend the contents of the support for the selecting operation groups $\{A_p, A_q\}$ ("yes" in step S164), then the related information in the basic operation file is amended (step S165). The learning kernel operation management device 18 invokes the operation model learning device 16 and operation model translating device 17 (steps S166 and S167) to notify them of the amendment request (step S168). It issues an instruction to support the amended contents of the selecting operation group $\{A_p, A_q\}$ (step S169), and returns to the standby state (step S151).

In response to the amendment request from the learning kernel operation management device 18, the operation model learning device 16 and operation model translating device 17 resume the support for the amended contents of the selecting operation groups $\{A_p, A_q\}$. $A_p'$ and $A_q'$ indicate the selecting operation groups $A_p$ and $A_q$ whose contents have been amended.

When the operator issues no request for a new support, suspension of support, or amendment of support ("no" in step S152, "no" in step S158, and "no" in step S164), the learning kernel operation management device 18 remains in the standby state (step S151).

Figure 25:
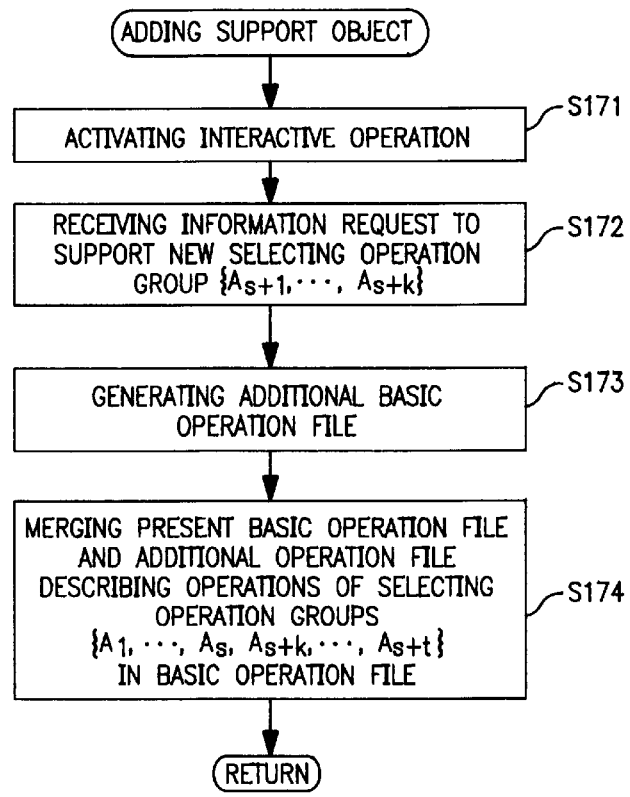
FIG. 25 is a flowchart showing an adding operation of a support object.

FIG. 25 is a flowchart of the operation for the additional support objects in step S153 shown in FIG. 24.

In FIG. 25, the learning kernel operation management device 18 activates the interactive operations in response to the request from the operator (step S171) to receive necessary information such as selection items and display restrictions, etc. of the new selecting operation groups $\{A_{s+1}, \ldots, A_{s+t}\}$ (step S172).

Next, an additional basic operation file containing the selecting operation groups $\{A_{s+1}, \ldots, A_{s+t}\}$ and their operation models, display method, etc. is generated (step S173). At this time, the information about the new selecting operation groups which have been entered for the basic operation file is retrieved from the memory of the system to generate an additional basic operation file.

Then, the additional operation file is merged into the current basic operation file to make a new basic operation file (step S174). The new basic operation file describes the operations of the selecting operation groups $\{A_1, \ldots, A_s, A_{s+1}, \ldots, A_{s+t}\}$.

Figure 26:
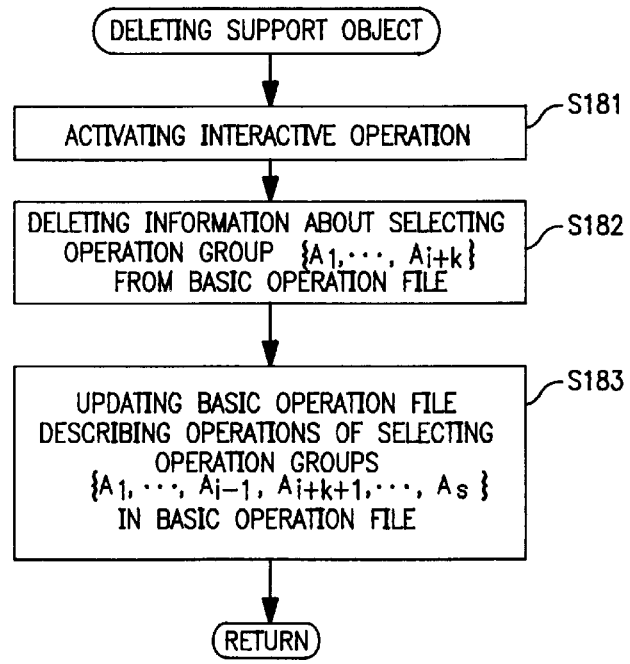
FIG. 26 is a flowchart showing a deleting operation of a support object.

FIG. 26 is a flowchart of the operation of deleting the support object in step S159 shown in FIG. 24.

In FIG. 26, the learning kernel operation management device 18 activates the interactive operations in response to the request from the operator (step S181). Then, it specifies the suspension of the support for the selecting operation groups $\{A_i, \ldots, A_{i+k}\}$ and requests the operation model learning device 16 and operation model translating device 17 to stop the support.

Next, the information about the selecting operation groups and their operation model, description of the display method, etc. is deleted from the basic operation file (step S182) and the basic operation file is updated (step S183). The deleted information is stored in the memory of the system.

The updated basic operation file describes the operations of the selecting operation groups $\{A_1, \ldots, A_{i+1}, A_{i+k+1}, \ldots, A_s\}$.

In response to the deletion request from the learning kernel operation management device 18, the operation model learning device 16 deletes the operation model of the selecting operation groups $\{A_i, \ldots, A_{i+k}\}$ and the operation model translating device 17 clears the descriptions of the display method. The operation history collecting device 14 disconnects the collection path of the operation history relating to the selecting operation groups. The selecting function providing device 13 notifies the operation software of the display method obtained up to now or the initial display method. Thus, the transmission path for the selecting operation groups $\{A_i, \ldots, A_{i+k}\}$ is disconnected.

Figure 27:
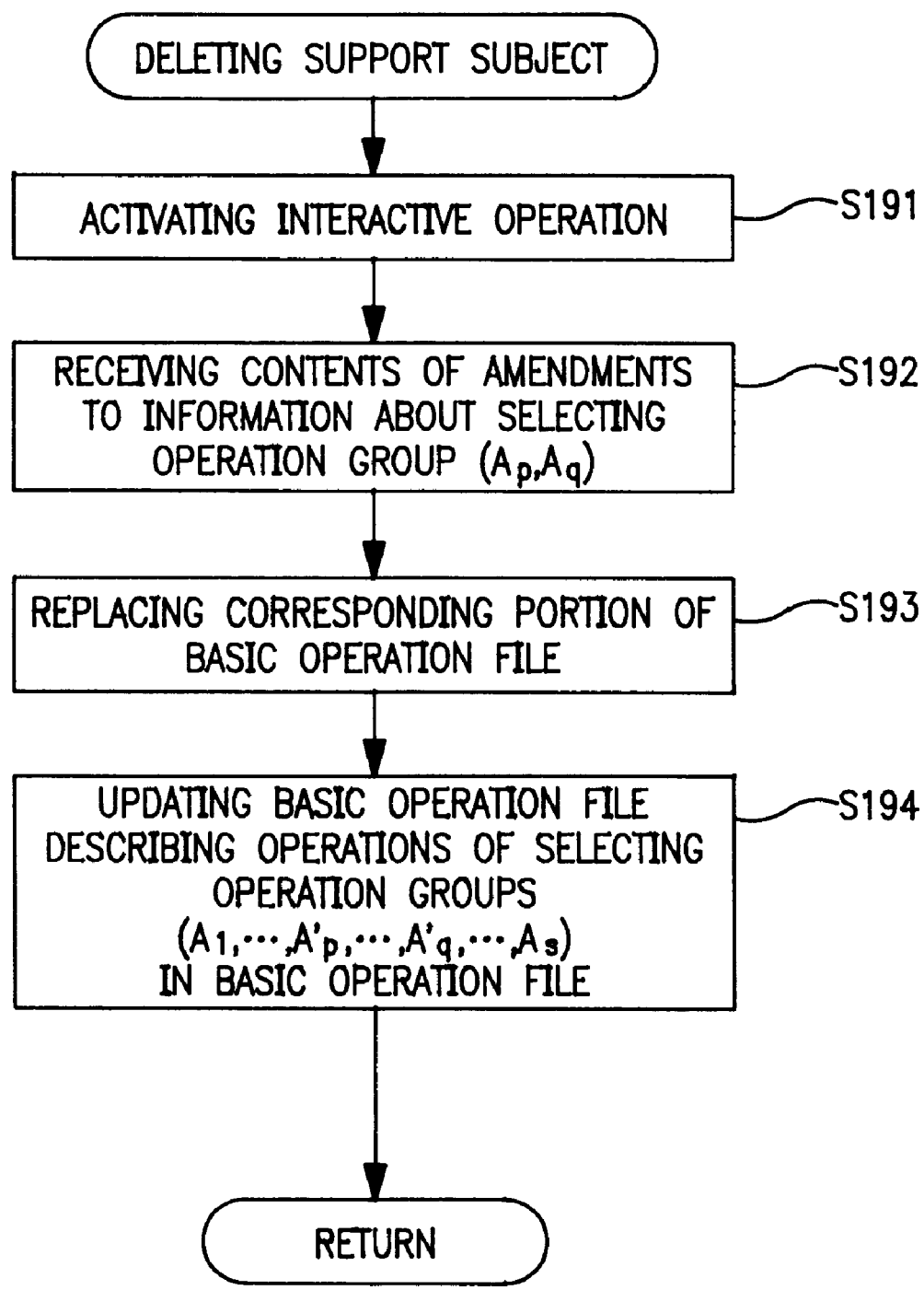
FIG. 27 is a flowchart showing a modifying operation of a support object.

FIG. 27 is a flowchart of the operation of amending the contents of the support in step S165 shown in FIG. 24.

In FIG. 27, the learning kernel operation management device 18 activates the interactive operations in response to the request from the operator (step S191). Then, it specifies the suspension of the support for the selecting operation groups $\{A_p, A_q\}$ and requests the operation model learning device 16 and operation model translating device 17 to stop the support.

In response to the support stop request from the learning kernel operation management device 18, the operation model learning device 16 and operation model translating device 17 stop the support for the selecting operation groups.

Then, the learning kernel operation management device 18 receives the contents of the amendments to the information such as the operation model of the selecting operation groups, description of the display method, etc. (step S192), replaces the corresponding portion in the basic operation file with the contents of the amendments (step S193), and updates the basic operation file (step S194).

The updated basic operation file describes the operations of the selecting operation groups $\{A_1, \ldots, A_p', \ldots, A_q', \ldots, A_s\}$.

Next, an example of each device shown in FIG. 1 realized by a work station having multiprocessing capabilities is described below by referring to FIGS. 28 through 34.

Figure 28:
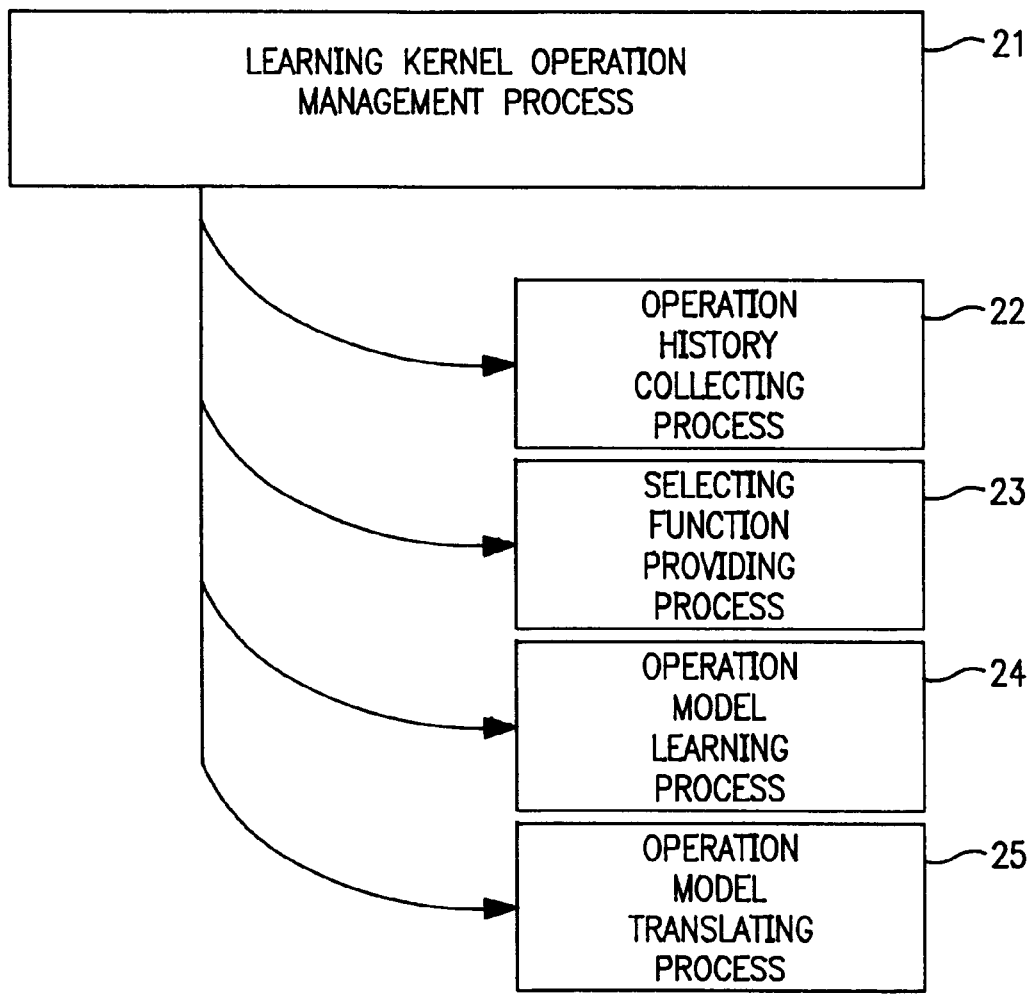
FIG. 28 shows an embodiment realized by the process according to the present invention.

FIG. 28 shows an example of generating a learning kernel operation management process 21, operation history collecting process 22, selecting function providing process 23, operation model learning process 24, and operation model translation process 25 on a single work station, respectively corresponding to the learning kernel operation management device 18, operation history collecting device 14, selecting function providing device 13, operation model learning device 16, and operation model translating device 17.

A communications path between processes is generated using the communications protocol of the system in which the processes are disposed. The learning kernel operation management process 21 functions as an important process to ensure the operation of each process work as the selection item display system 11.

The communications message transmitted through the communications path is transmitted and received between the processes shown in FIG. 28 and a plurality of operation software to be supported, and is used as a script regulating the operations of each process.

Generating each of the processes, etc. shown in FIG. 28 in a script language such as Perl saves labor in designing an exclusive receiver for processing communications messages, or releases the system from the operating system. Perl in UNIX enables the TCP/IP, that is, a standard communications protocol, to be supported to easily realize the inter-process communications. The operation software can be a drawing software to be used wxth a pointing device and graphic user interface (GUI)

In FIG. 28, the learning kernel operation management process 21 activates other processes 22, 23, 24, and 25. These processes 22, 23, 24, and 25 generate communications channels between processes in the procedure shown in FIGS. 29A, 29B, and 29C based on the operation settings, and reserve the communications path.

Each process has a communications interpreting routine as a communicator for transmitting and receiving communications messages determined by the selection item display system 11. The capabilities of the communicator such as the receivable communications messages and the operations performed on the received communications messages depend on the functions of the processes.

The communications channel of the communicator comprises, for example, a socket. The communications channel can be composed by directly composing a socket for communication and by generating communications processes through each of the process communicators. In this case, communications are established indirectly through the communications processes. The indirect communications ensures safety communications management.

Figures 29A, 29B:
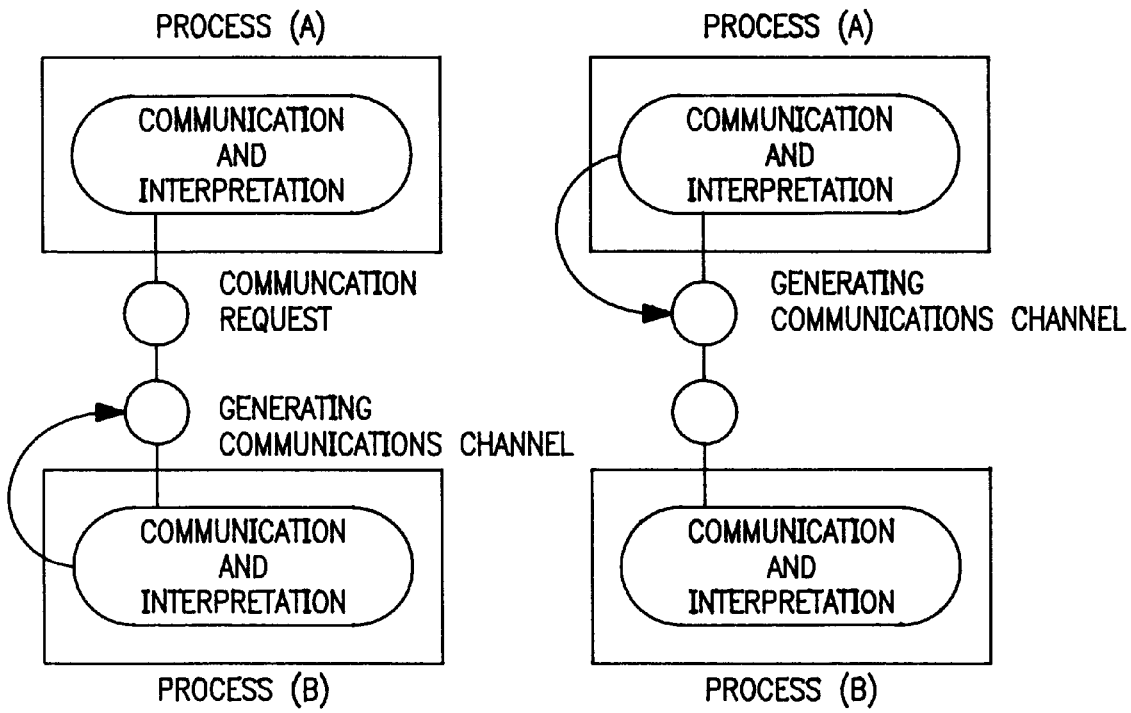
FIGS. 29A, 29B, and 29C show the method of creating the communications paths.
Figure 29C:
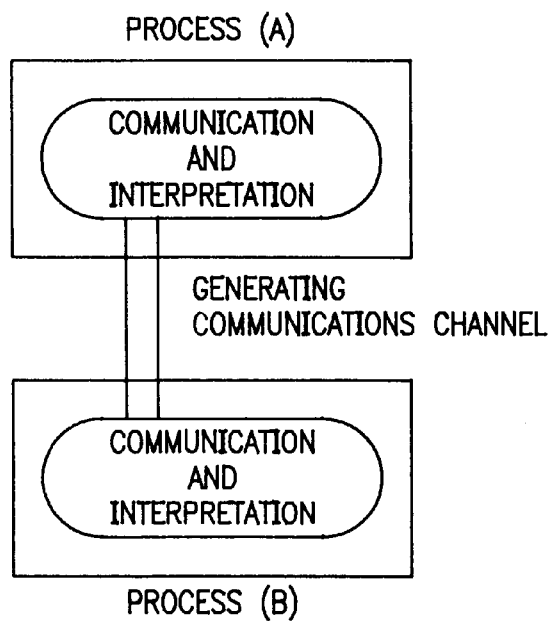

When process B generates its own communications channel and requests process A to start communications as shown in FIG. 29A, process A generates its own communications channel as shown in FIG. 29B. Thus, as shown in FIG. 29C, an inter-process communications path is established between processes A and B. Processes A and B refer to any of the processes 21, 22, 23, 24, and 25.

Figure 30:
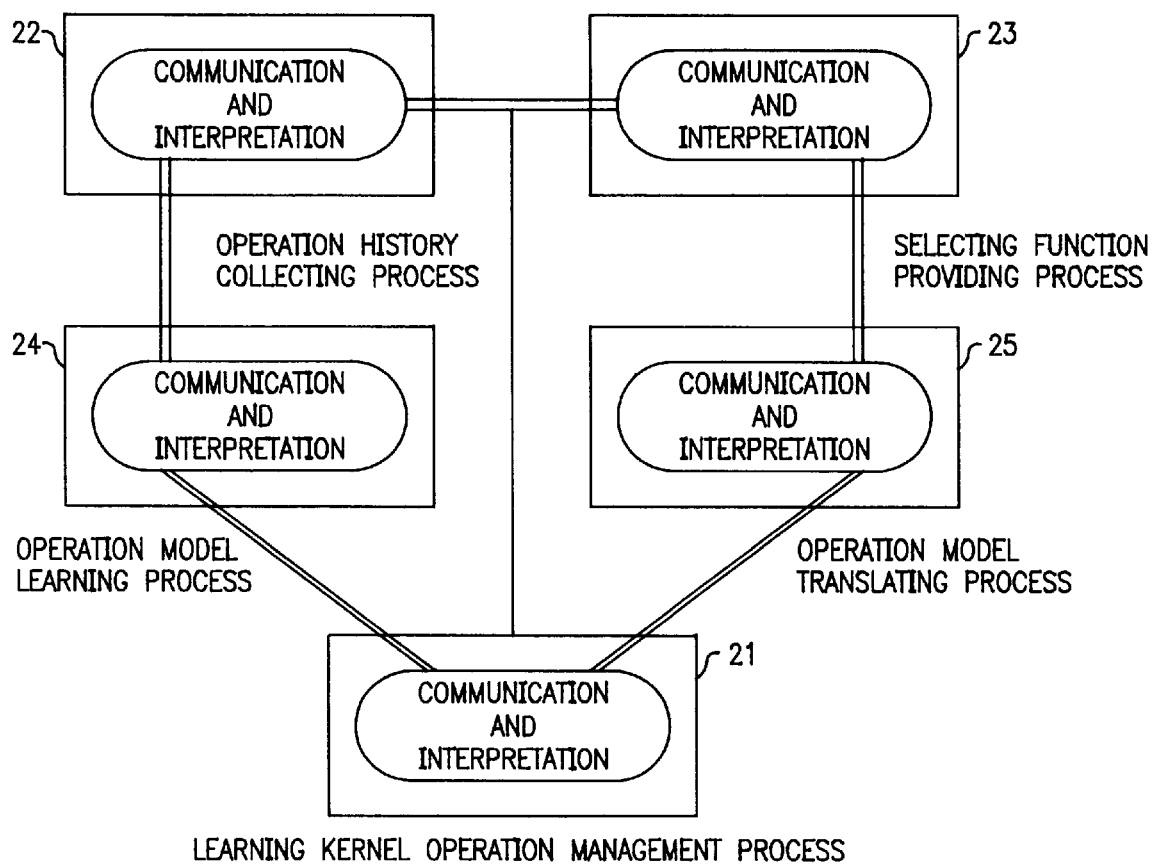
FIG. 30 shows the communication path of the selection item display system.

FIG. 30 shows the communication path set in the selection item display system 11 by the procedure shown in FIGS. 29A, 29B, and 29C. The communications are performed in both directions in each of the established communications paths. The communications channels of the two processes connected through each of the communications paths are equivalent to each other. The capacity of each communications path depends on its own function, and the number of pairs of communications channels for the communication path depends on the capacity.

If the selection item display system 11 is successfully designed without waste, then the capabilities of each communicator, such as the type and length of a receivable communications message, is represented clearly. For example, the communications paths of the learning kernel operation management process 21 and selecting function providing process 23 do not have to be assigned the same capabilities in all aspects. The communications path of the learning kernel operation management process 21 is more static, while the communications path of the selecting function providing process 23 is more dynamic. The communications path of the selecting function providing process 23 should be more dynamic to quickly transmit the information to the operation software or to frequently receive support contents from the operation model translation process 25.

Figures 31A, 31B:
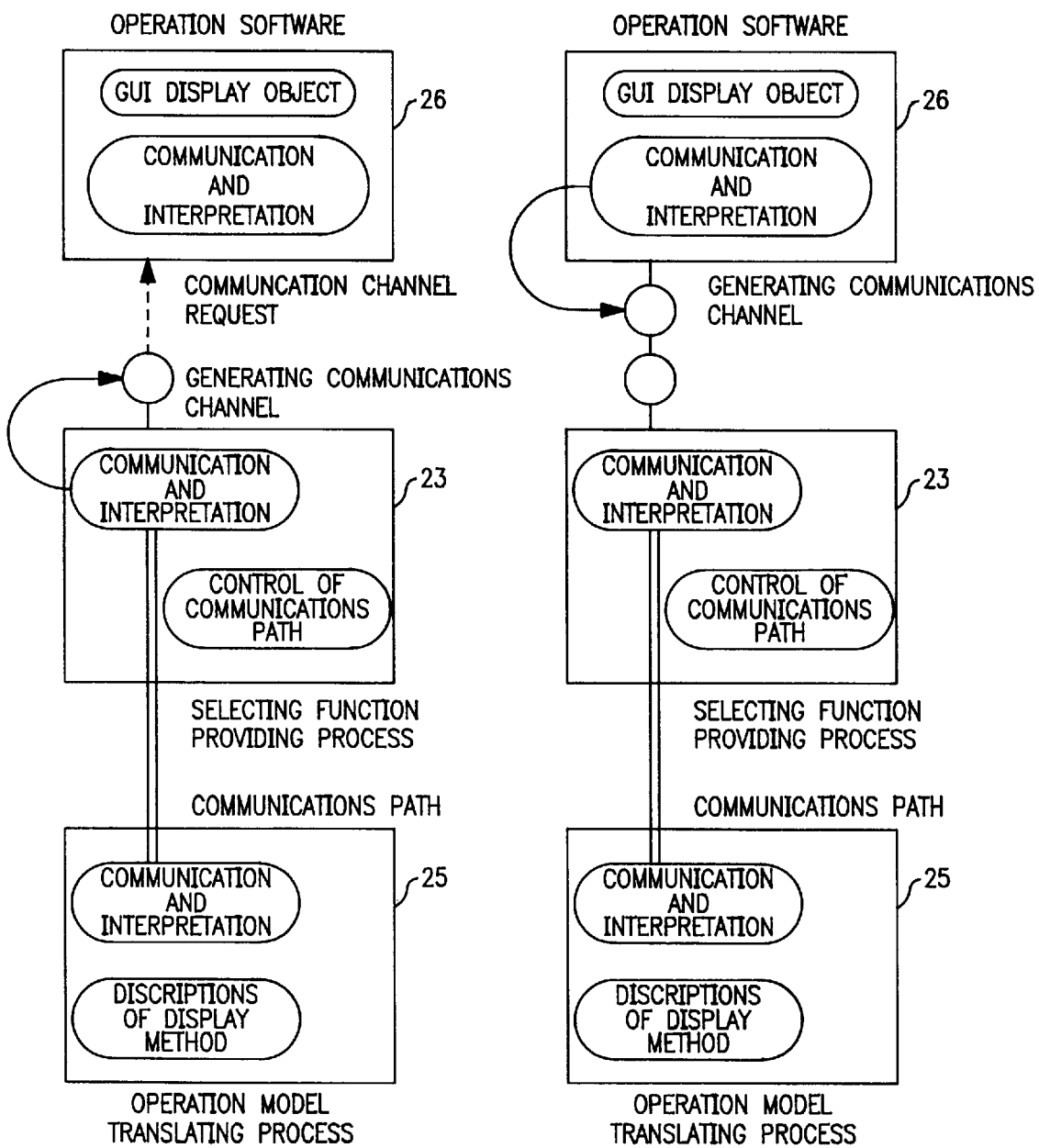
FIGS. 31A, 31B, and 31C show the method of connecting the selecting function providing process to the operation software.
Figure 31C:
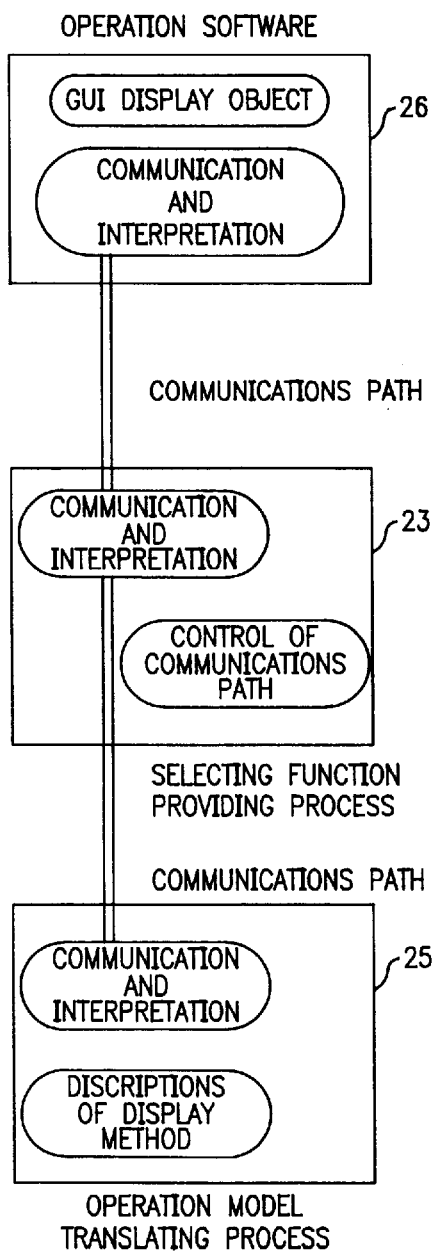

FIGS. 31A, 31B, and 31C show the method of connecting the selecting function providing process 23 with the operation software. Like the process, an operation software 26 is provided with a communicator for communications and interpretation.

The communicator for communications and interpretation of the operation software 26 working on the communications with the selecting function providing process 23 checks and changes the internal state of the operation software 26. However, a state variable is not open to the communicator in all levels of the operation software 26, but open for the GUI display objects for which the user requires the support of the learning capabilities.

As shown in FIG. 31A, the selecting function providing process 23 establishes a communications path to the operation model translation process 25, generates a communications channel, and requests the operation software 26 to start the communications. Then, as shown in FIG. 31B, the operation software 26 generates a communications channel to establish a communications path between the selecting function providing process 23 and the operation software 26 as shown in FIG. 31C.

Figure 32A:
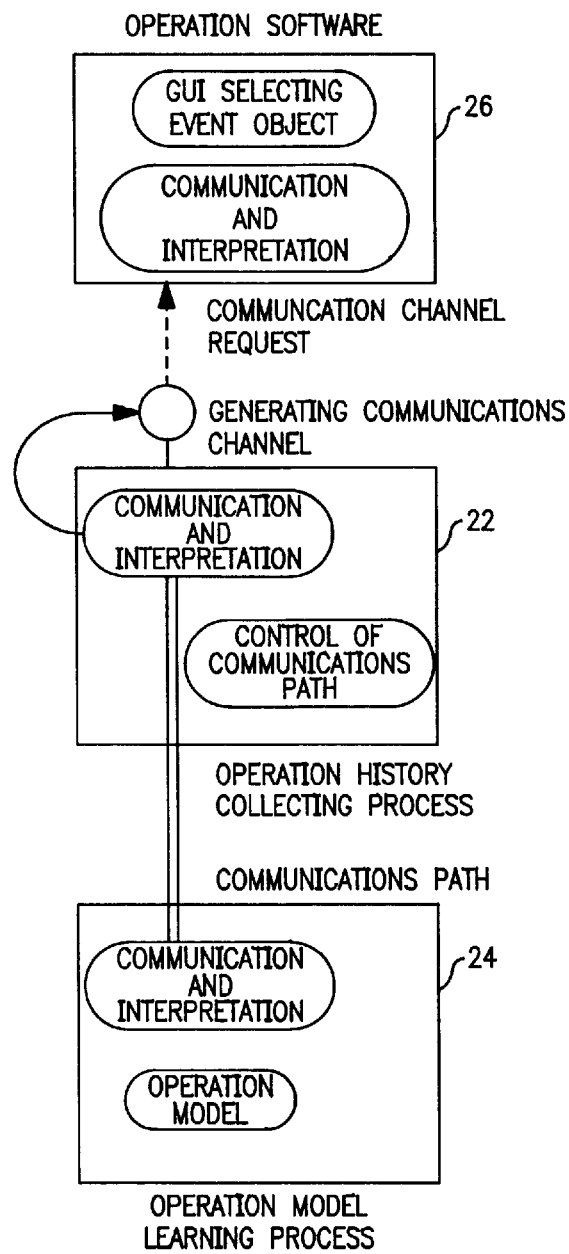

FIGS. 32A, 32B, and 32C show the method of connecting the operation history collecting process 22 to the operation software.

The object released for the operation history collecting process 22 by the communicator of the operation software 26 for the communications with the operation history collecting process 22 is used to manage the event associated with the selecting operations of the GUI (GUI selection event object).

As shown in FIG. 32A, the operation history collecting process 22 establishes a communications path to the operation model learning process 24, generates a communications channel, and requests the operation software 26 to start the communications. Then, as shown in FIG. 32B, the operation software 26 generates a communications channel to establish a communications path between the operation history collecting process 22 and the operation software 26 as shown in FIG. 32C.

Figure 33:
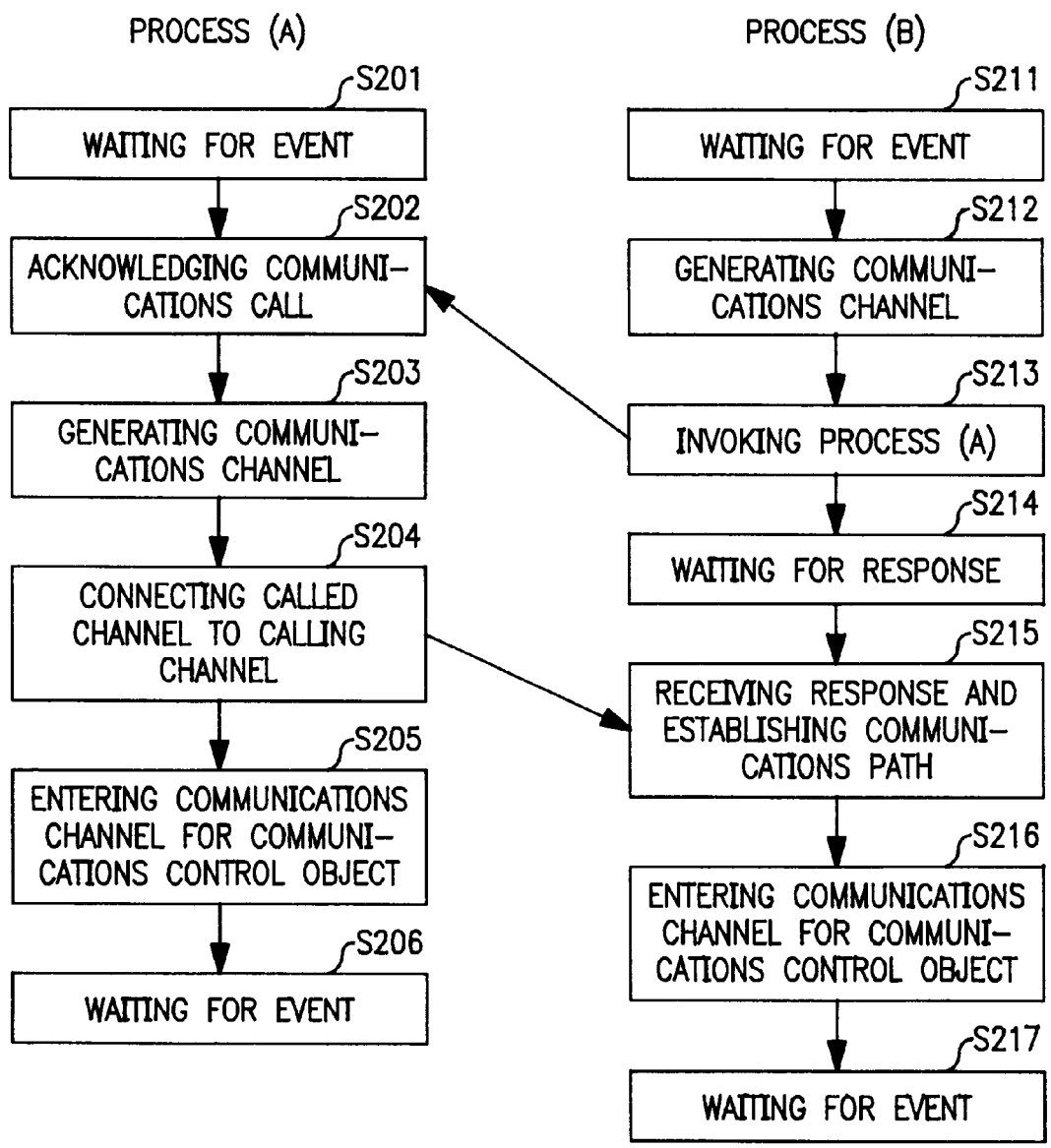
FIG. 33 is a flowchart showing the process of forming a communications path.

FIG. 33 is a flowchart showing the process of establishing a communications path between processes A and B shown in FIGS. 29A, 29B, and 29C.

Process B in an event-wait state (step S211) generates its own communications channel when communications should be established (step S212), invokes process A (step S213), and waits for a reply from process A (step S214).

Process A in an event-wait state (step S201) acknowledges the call from process B (step S202), generates its own communications channel (step S203), and responds to the call by connecting its own communications channel to the communications channel of the correspondent process B (step S204).

Then, process A enters the communications channels for the communications control object (step S205) and enters in an event-wait state (step S206).

In response to the reply from process A, process B acknowledges the establishment of the communications path (step S215), enters the communications channel for the communications control object (step S216), and enters an event-wait state again (step S217).

Figure 34:
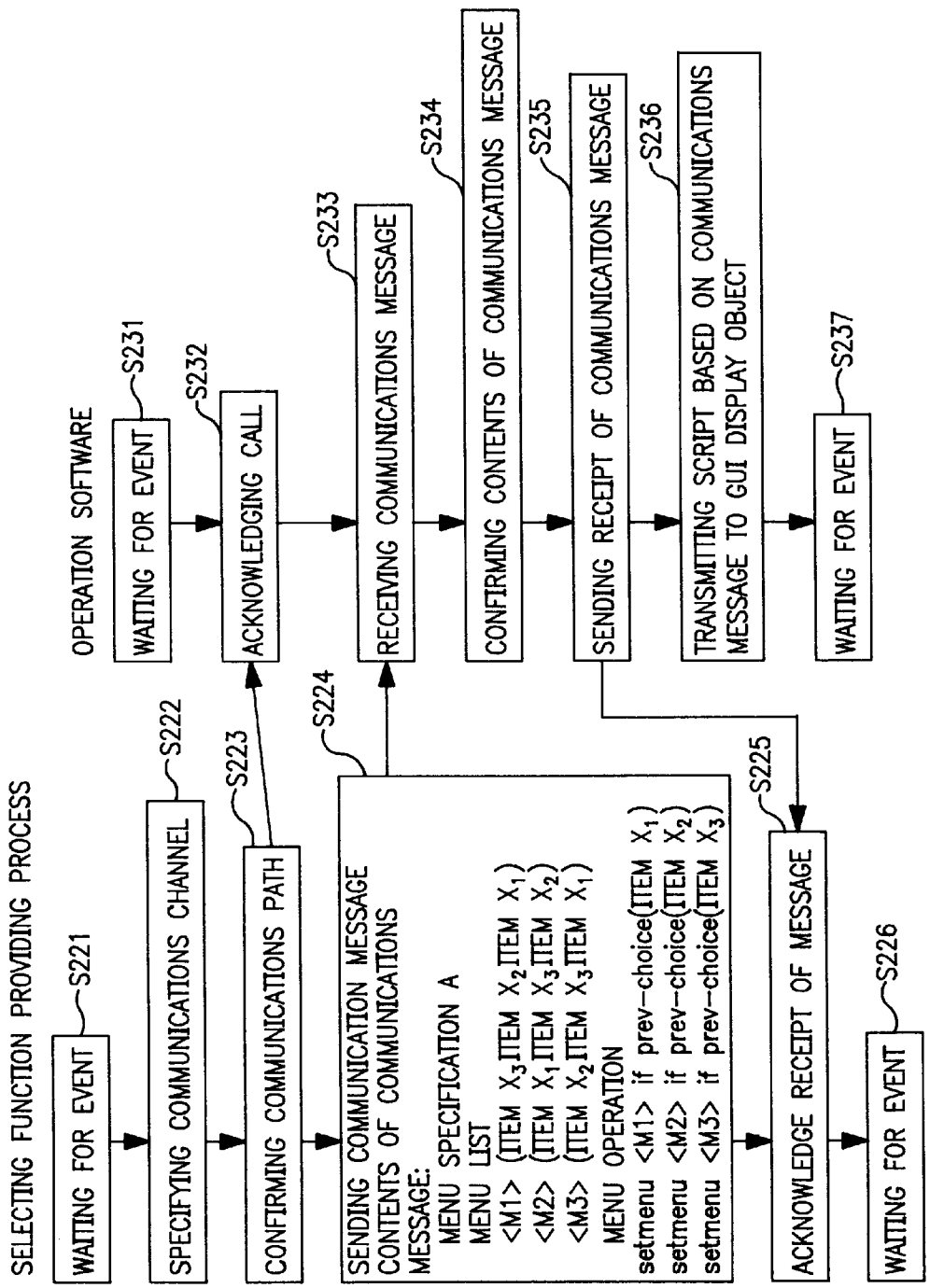
FIG. 34 is a flowchart showing an example of the communications message and the transmission of the message.

FIG. 34 shows an example of the communications between the selecting function providing process 23 and the operation software 26 performed through the thus generated communications path.

The selecting function providing process 23 which is first in the event-wait state (step S221) receives a script of a new displaying operation of a support object from the operation model translation process 25, and specifies the communications channel through which the communications are established with the operation software 26 (step S222).

Next, the selecting function providing process 23 confirms the communications path to the communicator of the operation software 26 (step S223), and transmits a communications message which is the script of the menu display method and operation method supported by the operation software 26 (step S224). In this process, for example, a menu list showing the display order corresponding to the description shown in FIG. 21 and a menu operation are transmitted.

The communicator of the event-waiting operation software 26 acknowledges a call from the selecting function providing process 23 (step S232), receives a transmitted communications message (step S233), confirms the contents of the communications message (step S234), and notifies the communicator of the selecting function providing process 23 of the completion of the reception of the communications message.

Then, the operation software prepares a script receivable by the GUI display object after interpreting the contents of the communications message, sends the script to the GUI display object (step S236), and enters in the event-wait state (step S237).

The script sent to the GUI display object clearly describes a communications path control routine required to control the communications with another operation software and smoothly communicates with the learning kernel 15. This is a program for improving the reliability of the system and is effective when a number of processes are cooperating.

When the selecting function providing process 23 receives the notification of the reception of the message from the operation software 26, it acknowledges the reception of the communications message at the operation software 26 (step S225) and enters the event-wait state (step S226).

With the above described system configuration of the embodiment, the abstract characteristic of the learning kernel 15 is generally improved by separately describing the operation model from its display method. Thus, the learning kernel 15 can provide the similar learning capabilities collectively for the selecting operation groups having the same operation model but different display formats, for example, different menus in the same software, menus of different sets of software, next candidate for conversion into Kanji (Japanese-style Chinese character) in a front-end processor, etc. For different display methods or display restrictions, the description file should be prepared to manage them for each selecting operation group.

Generating the learning kernel 15 enables different operation models to be properly managed and provided with the learning capabilities. Accordingly, if a change occurs in the operation model of a certain selecting operation group, an appropriate action can be taken through the learning capabilities. A complete amendment to the operation model can be made by interactive processes, searching for a predetermined operation model, etc.

The hierarchical structure of the learning kernel 15 easily realizes the management and reuse of the descriptions of support objects, operation models, and display methods. As a result, they can be optionally used individually or in combination. Especially, the selecting function through the operation model anticipated by the learning capabilities and the description of the display method for the operation model can be excluded from the management of the system to provide the function of a single function for an operation.

The user can determine a support object according to his or her requirement using the interactive processes provided by the learning kernel operation management device 18. In the processes, appropriate support can be guaranteed by simply issuing a request to the learning kernel 15 to optimize the operation efficiency of a plurality of different selecting operation groups.

Additionally, the user can enter a new operation model required for his or her job to dynamically change the learning capabilities according to the model.

According to the above described embodiment, a support object is described as a selecting operation. If a learning method is established using an appropriate probability model, then a more complicated operation can be described by a consistent method. In this case, the selection item display system 11 shown in FIG. 2 is used as a platform for realizing the optimum operation amount.

Practically, the operations can be performed more efficiently by providing the learning capabilities for the processes of the operation systems and application software in the computer, and having the user operations reflecting the contents of the descriptions through the probability obtained by an operation model and the descriptions of the operating method.

For example, in a cooperative operation between a computer and a user, the present invention can be applied to the management of a dynamic library executed by the operating system and application software.

In dynamically loading a plurality of libraries into the memory, preliminarily loading the related libraries collectively and preliminarily determining the hierarchy of the libraries to determine the loading order, successfully configures the library management system in which the amount of the computer resources such as the memory required for the dynamic library management by the operating system, the CPU, etc. can be optimized. Thus a quick response of the operating system, etc. can be realized appropriately.

Furthermore, the present invention can also be applied to inventory management for adjusting the number of video tapes in a video library by accessing the latest topics.

What is claimed is:

1. A system for displaying a plurality of selection items of an operation group, selected by a user from a plurality of operation groups, in an order, by using an information processing device, comprising:

collecting means for collecting a selection item selected by the user from the selected operation group;

learning means for selecting an operation history corresponding to the selected operation group, and generating an operation model indicating a feature of a selecting operation performed by said user according to the selected operation history, the operation model being generated based on a secondary or higher order Markov model which determines probabilities of a third and subsequent selection items to be selected after a first selection item is selected;

translating means for generating descriptions of a display method based on both of the operation model generated by said learning means and a display restriction specifying a display format of the selection items, the descriptions being constructed in consideration of probabilities with which items are selected, the probabilities varying depending on an operation context in which a plurality of items are selected sequentially by the user; and display means for displaying said selection items based on descriptions of the display method generated by said translating means.

2. The system according to claim 1, wherein:

said learning means also learns a second operation history in accordance with history information from the selected operation history, represents a probability with which said selection item is selected, and generates said operation model not limited by said display restrictions.

3. The system according to claim 2, wherein:

said learning means generates said operation model using a probability model in which a selection item rate in a plurality of previously selected selection items is used as a probability with which said selection item is selected.

4. The system according to claim 2, wherein:

said learning means determines a ratio of an initial selection item being a primary selection item and a next selection item being a secondary selection item to a number of sets for said initial selection item being said primary selection item among sets for two selection items selected continuously in previously selected plural selection itemis, uses a probability model of said ratio being a probability with which said second selection item is selected after said primary selection item is selected, and then generates s aid operation model.

5. The system according to claim 2, wherein:

said learning means selects a probability model describing the probability that said selection item is selected, and then generates said operation model suitable for features of said selecting operation performed by said user.

6. The system according to claim 2, further comprising:

storing means for storing said operation model, and wherein:

said learning means amends the probability with which said selection items in said operation model, stored in said storing means, are selected based on said second operation history, and updates said operation model.

7. The system according to claim 2, wherein:

said display means displays the plurality of operation groups; and said collecting means collects said selection items selected by said user from the selected operation group as the second operation history by a collecting method specified by said learning means, and transfers the second operation history to said learning means by a transfer method specified by said learning means.

8. The system according to claim 1, wherein:

said translating means evaluates the operation model and determines a display order of the selection items, and generates a description for an optimum display method according to the determined display order and the display restriction; and said display means displays said selection items according to the selected operation and a display format specified by the description of the optimum display method.

9. The system according to claim 1, further comprising:

storing means for storing descriptions of said display method, and wherein:

said translating means updates the descriptions of said display method stored in said storage means according to an update of said operation model and amendments to display restrictions.

10. The system according to claim 1, wherein:

said display means dynamically amends the display formats of said selection items according to an update of descriptions of said display method by said translating means.

11. The system according to claim 1, further comprising:

management means for specifying one operation of said system, providing a probability model capable of being used for a specified selecting operation to said learning means, providing said display restriction and a display order evaluating method capable of being used for said specified selecting operation, and managing an operation for said translating means and said learning means.

12. The system according to claim 11, wherein:

said management means uses a basic operation file describing at least one of said specified selecting operation, said probability model, an evaluation method, and said display restrictions, and collectively manages thereby operations for said learning means and said translating means.

13. The system according to claim 12, wherein:

said management means adaptively generates a basic operation file through an interaction with said user or a system manager.

14. A system, comprising:

collecting means for collecting a plurality of operation results from a user working on information processing systems as a plurality of corresponding operation histories;

learning means for selecting an operation history from the plurality of operation histories, and generating an operation model representing user operation characteristics based on the selected operation history transferred from said collecting means, the operation model being generated based on a secondary or higher order Markov model which determines probabilities of a third and subsequent selection items to be selected after a first selection item is selected;

translating means for generating an operational method description based on the operation model generated by said learning means, the operational method description being constructed in consideration of probabilities with which items are selected, the probabilities varying depending on an operation context in which a plurality of items are selected sequentially by the user; and display means for providing an operation method to said user based on said operational method description generated by said translating means.

15. The system according to claim 14 further comprising:

processing means for loading and executing a library used by the user working on said information processing systems; and wherein:

said collecting means collects said plurality of operation histories in response to a corresponding loading order for said library loaded by user operations; and said display means provides an operation method fitting said user operations.

16. A system, comprising:

learning means for selecting an operation history from a plurality of operation histories;

translating means for determining a ratio of an initial selection item, being a primary selection item, and subsequent selection items to a number of sets for said primary selection item among sets for plural selection items selected continuously in previously selected plural selection items of the selected operation history, such that the plural selection items are selected according to a secondary or higher order Markov model, and deciding a display order of subsequent selection items when said primary selection item is selected based on said ratios; and display means for displaying a selection item according to the display order decided by said translating means, thereby displaying selection items in an order decided by an operation context which is a sequence in which the user previously and sequentially selected the selection items.

17. A method for displaying a selection item, comprising the steps of:

collecting selection items selected by a user as corresponding operation histories;

selecting an operation history from the plurality of operation histories;

generating an operation model indicating user selecting operation characteristics based on the selected operation history, the operation model being generated based on a secondary or higher order Markov model which determines probabilities of a third and subsequent selection items to be selected after a first selection item is selected;

generating a display method description based on a generated operation model and a display restriction designating a selection item display format, the display method descriptions being constructed in consideration of probabilities with which items are selected, the probabilities varying depending on an operation context in which a plurality of items are selected sequentially by the user; and displaying said selection items based on the generated display method description.

18. The method according to claim 17, wherein:

said operation model is generated based on a probability model in which a ratio of a selection item contained in previously selected plural selection items is a probability for a selection item to be selected.

19. The method according to claim 17, wherein:

a ratio of an initial selection item being a primary selection item and a next selection item being a secondary selection item among sets for two selection items selected continuously in previously selected plural selection items is determined, and said operation model is generated based on a probability model in which said ratio is a probability for said secondary selection item after said primary selection item is selected.

* * * * *